INVENTORS.
Arnold A. Pierson,
Floyd E. Smithberg,
& Michael C. Supitilov.
By: Robert L. Kahn Atty.

INVENTORS.
Arnold A. Pierson,
Floyd E. Smithberg,
& Michael C. Supitilov
By: Robert L Kahn Atty.

MAGNETIC RECORDING AND REPRODUCING MACHINE

Filed Feb. 24, 1955 9 Sheets-Sheet 3

INVENTORS
Arnold A. Pierson,
Floyd E. Smithberg
& Michael C. Supitilov.
By: Robert L Kahn Atty.

Aug. 30, 1960 A. A. PIERSON ET AL 2,951,127
MAGNETIC RECORDING AND REPRODUCING MACHINE
Filed Feb. 24, 1955 9 Sheets-Sheet 4

INVENTORS.
Arnold A. Pierson,
Floyd E. Smithberg,
& Michael C. Supitilov
By: Robert L Kahn Atty

MAGNETIC RECORDING AND REPRODUCING MACHINE

INVENTORS
Arnold A. Pierson,
Floyd E. Smithberg,
& Michael C. Supitilov
By: Robert L Kahn Atty.

INVENTORS.
Arnold A. Pierson,
Floyd E. Smithberg,
& Michael C. Supitilov.
By: Robert L. Kahn Atty.

INVENTORS
Arnold A. Pierson,
Floyd E. Smithberg
& Michael C. Supitilov.
By: Robert L. Kahn Atty.

MAGNETIC RECORDING AND REPRODUCING MACHINE

Filed Feb. 24, 1955 9 Sheets-Sheet 8

INVENTORS.
Arnold A. Pierson,
Floyd E. Smithberg,
& Michael C. Supitilov.
By: Robert L Kahn Atty.

MAGNETIC RECORDING AND REPRODUCING MACHINE

Filed Feb. 24, 1955

INVENTORS
Arnold A. Pierson,
Floyd E. Smithberg,
& Michael C. Szpitilov.
By: Robert L. Kahn Atty.

United States Patent Office 2,951,127
Patented Aug. 30, 1960

2,951,127

MAGNETIC RECORDING AND REPRODUCING MACHINE

Arnold A. Pierson, Floyd E. Smithberg, and Michael C. Supitilov, St. Charles, Ill., assignors to Du Kane Corporation, St. Charles, Ill., a corporation of Delaware Filed Feb. 24, 1955, Ser. No. 490,235

21 Claims. (Cl. 179—100.2)

This invention relates to a magnetic recording and reproducing machine and more particularly to a machine of this character adapted to use flexible belts carrying magnetizable coatings.

Magnetic recording and reproducing devices have many inherent advantages over other recording and reproducing devices and also suffer from certain disadvantages. Thus a substantial advantage is the ease with which recording and reproduction may be effected and the ability of a record to be reused indefinitely. Where the record is in the form of a wire or tape, the lack of ready accessibility to any desired portion of the record constitutes a serious drawback. To overcome such a disadvantage, magnetic recorders and reproducers have been designed for use with disc and belt types of records. When records of such type are to be used, fundamental difficulties with respect to tracking present themselves.

Inasmuch as a magnetized record has no inherently visually discernible sound track, the sound track consisting of an imaginary track containing the magnetized record material, it is necessary to provide means for insuring tracking between the reproducer mechanism and the record. No tracking difficulty exists during recording as the act of recording on the record material results in the creation of a magnetized sound track. It is essential that during recording some means be provided for causing the recording head to move and describe a sound track on the record. The tracking problem with machines of this character exists during reproduction.

An apparent solution to this problem involves the use of a lead screw for the transducer head, the lead screw causing the head to travel on the record and define a sound track. For reproduction, it is necessary to secure correspondence between the reproducing head and the sound track at the beginning of the record and thereafter theoretically the lead screw should permit of tracking during the entire record reproduction.

Whether the record is of the disc type or of the belt type, fundamental difficulties have arisen in apparatus having a lead screw type of tracking means. With either type of record, the economics of the situation demands that a record have a maximum track length to provide a reasonably long period for recording on or reproducing from one record. In both the disc and belt type of record, the sound track will start at one part of the record—in the case of a disc near the outside of the record and in the case of a belt near one edge of the record—and will gradually work over toward another part. Thus in both kinds of records the record track must have pitch. In a disc record, the pitch will be related to a spiral. In a belt record, the pitch will be related to a helix. In both cases, the pitch will be a function of record speed and the size of the record. A reasonably long playing record would therefore require a fine record track pitch, assuming, of course, that the physical size of the record itself is to be small.

To maintain tracking throughout an entire record during reproduction, it is essential that the tracking tolerances be of a lower order than the thread or record track pitch. Thus for example, records having a stylus for establishing a hill-and-dale type of record on the disc customarily have a pitch of the order of about 200 threads per inch. In this type of record, once a record groove has been cut, the stylus simply follows during reproduction. Considerations of record duration and record speed make it necessary to use such a fine pitch on a stylus type of record. Considerations of record duration are equally cogent with a magnetic type of record, although record speed may be reduced. Because of its characteristics, the pitch of the track in a magnetic record may be about four or five times as coarse.

Thus as an example, a pitch of 50 threads per inch with a belt width of about four inches is practical for magnetic records. This takes into consideration the overall size of the belt, surface speed for proper recording and reproduction, suitable record time and other factors determined by technical and competitive considerations. Such a belt would have two hundred tracks thereon. To maintain transducer registration with a track involves considerations of mechanical tolerances and record dimensional stability. Thus for mechanical tolerances, care would have to be exercised to limit weaving of the record belt due to mandrel inaccuracies and belt inaccuracies. One half of one percent departure from perfect alinement means an entire track off from the two hundred on the belt.

Apart from considerations of mechanical accuracy is the fact that the record material itself will change its dimensions due to atmospheric conditions sufficiently to introduce mistracking. Assuming the record base material is some plastic, it is well known that plastics may vary as much as two or three percent in dimensions with changes in temperature and humidity occurring in an office or home. Unless manual or complex automatic track-correcting means are provided, serious mistracking is bound to occur with a screw type of feed.

The present invention relates to a machine adapted to cooperate with a pregrooved belt as a record member. In such a magnetic recording and reproducing machine, the focal region for accuracy is in the grooves or tracks on the belt. The accuracy demands upon the machine are greatly reduced because there is no tendency to accumulate tolerance errors as the record progresses, although such a machine has individual and peculiar requirements which will be set forth in connection with a detailed description thereof.

In general, a machine embodying the present invention utilizes a pair of spaced parallel mandrels upon which a flexible record belt is disposed. A transducer head is provided and means for mounting the same are provided so that tracking of the head on a record groove is readily accomplished. The new machine includes simple and effective alarm means for indicating to an operator that the end of the belt has been reached or that the belt is not properly positioned on the mandrels or an absence of the belt. The new machine also embodies suitable drive means with clutches so that the belt may be driven in forward or reverse direction at desired speeds. The belt drive is so designed that most of the inertia in the entire drive system resides in the portion of the drive which operates unidirectionally with the motor and does not necessarily stop or reverse direction when the belt is stopped or reversed. The belt drive also includes means whereby the belt will tend to reach and maintain a stable position on the mandrels.

While the record belt does not transmit any substantial power, there is the problem of insuring that a belt is easily positioned correctly on the mandrels or tends to assume such correct position and has no tendency to move from a correct position on the mandrels. The fact that the belt is moved in forward or reverse direction complicates this problem.

In the new machine using a record belt, crowning of the mandrels is undesirable since it tends to distort the belt. Flanges at both ends of the mandrel are not desirable since the belt must be readily changed. Furthermore, extreme accuracy in parallel mounting of the mandrel axes is not practical for quantity production. It is also undesirable to provide adjustment means for obtaining mandrel parallelism.

A machine embodying the present invention has idler means which function not only to tension the record belt when in use and release the belt for changing but additionally cooperates with the record belt so that the record belt, in both travel directions, will tend to assume and maintain a correct belt position on the mandrels.

Additionally to the above, a simple remote control for effecting forward or reverse belt travel in conjunction with circuit controls for talking or listing is provided. A hand microphone with simple and effective interlocked controls for selecting Recording, Listening or Reverse action also forms a part of the new machine.

Referring now to the drawings, there is shown an illustrative embodiment of the invention. It is understood that variations may be made without departing from the scope of the invention except as defined by the appended claims. In the drawings, Figure 1 is a perspective view of the new magnetic recording-reproducing machine, the handset microphone being shown detached from the machine and the machine being shown without a cover.

Figure 2 is a perspective view of a portion of the machine illustrated in Figure 1, certain parts of the machine being removed and certain other parts of the machine being swung back and disassembled to illustrate the various features of construction.

Figure 2*a* is a sectional detail on line **2*a*—2*a*** on Figure 2 illustrating the construction of the erase magnet means.

Figure 7A:
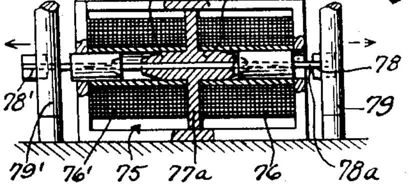

Figure 7*a* is a detail of the clutch control solenoid means.

Figures 7, 8:
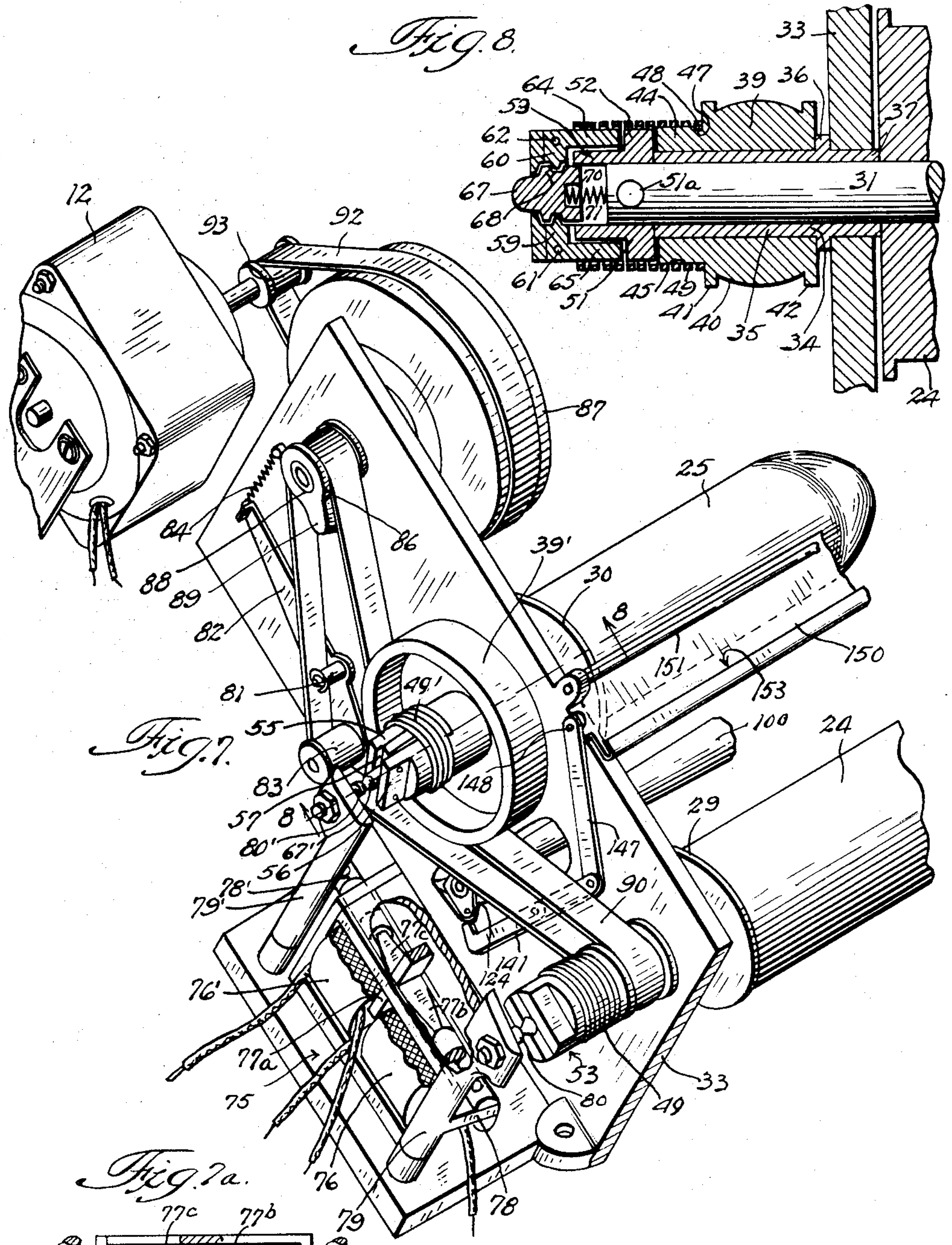
Figure 7 is a perspective view of the drive portion of the new machine together with the clutches and clutch control means.

Figure 8 is a sectional detail along line 8—8 of Figure 7 illustrating the novel clutch mechanism for the mandrels carrying the record belt.

Figures 1, 9:
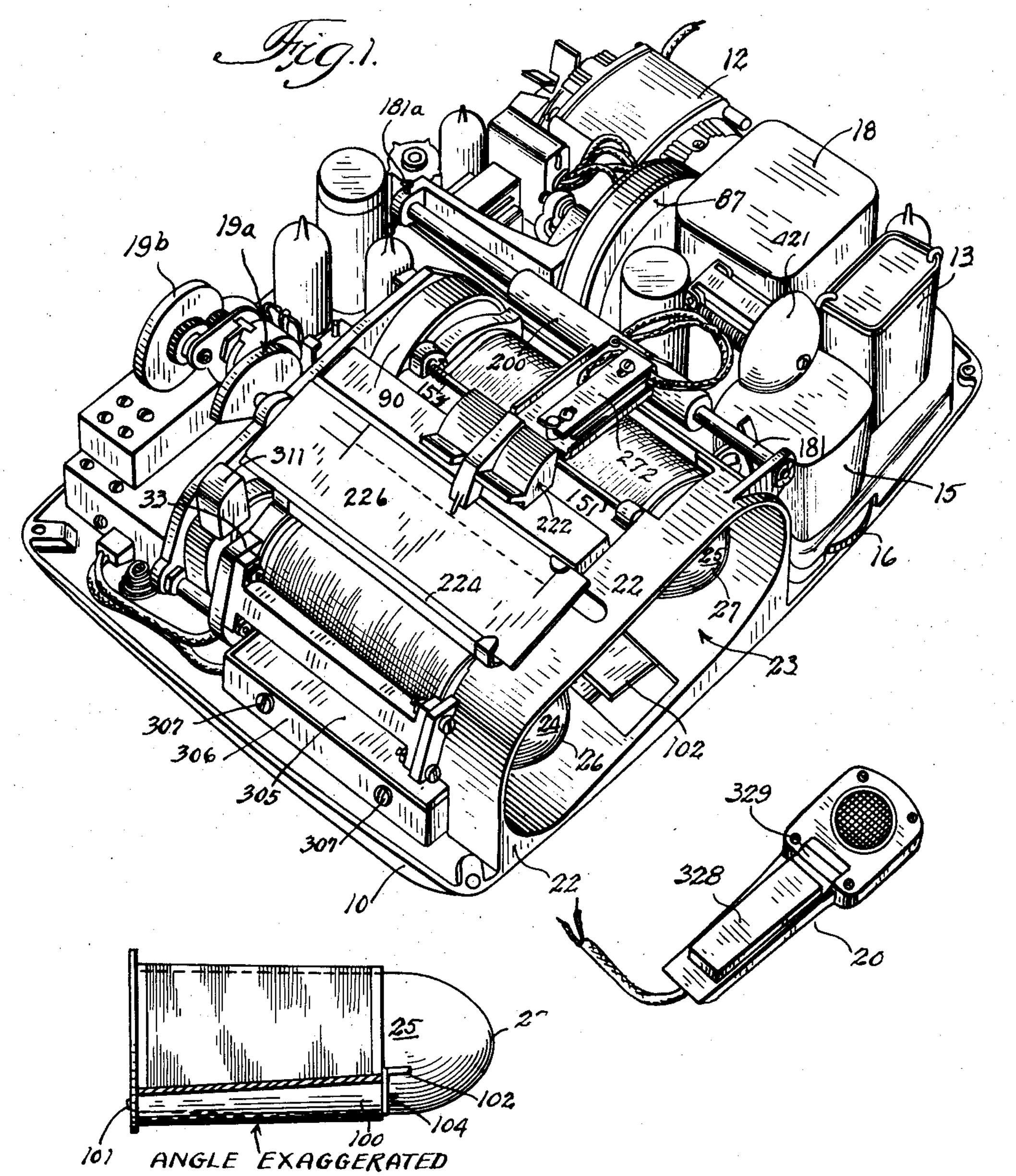

Figure 9 (on Sheet 1) is a detail illustrating the tensioning roller for tensioning the record belt.

Figures 10, 10A, 10B:
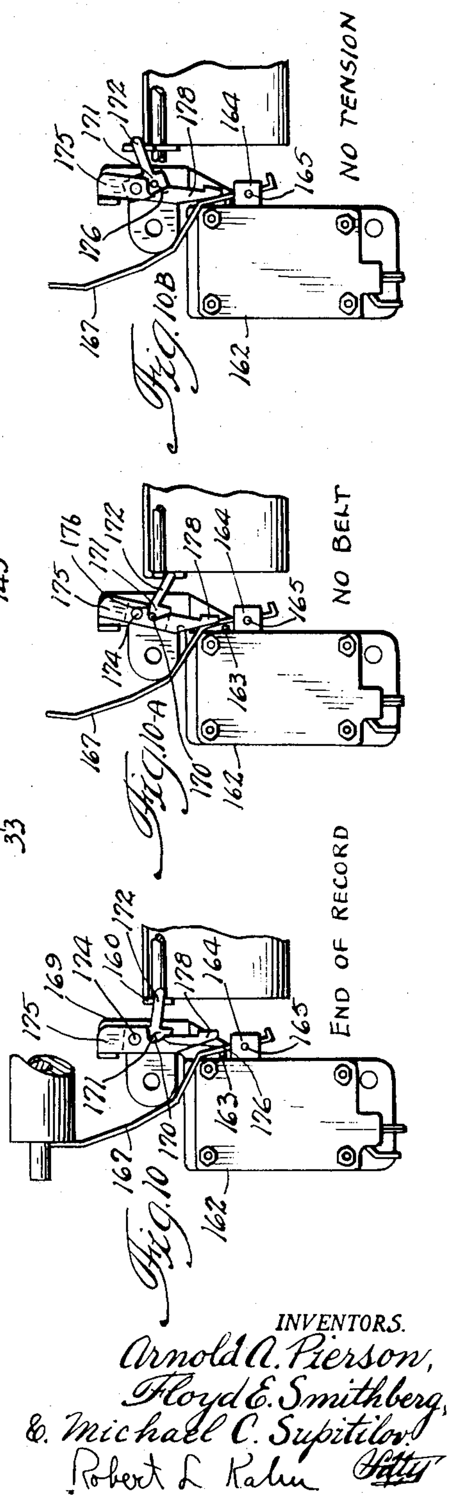

Figures 10, 10–A and 10–B are three details illustrating the alarm or warning switch mechanism, the three details illustrating three different conditions under which an alarm will sound.

Figures 11, 12, 13, 14, 15:
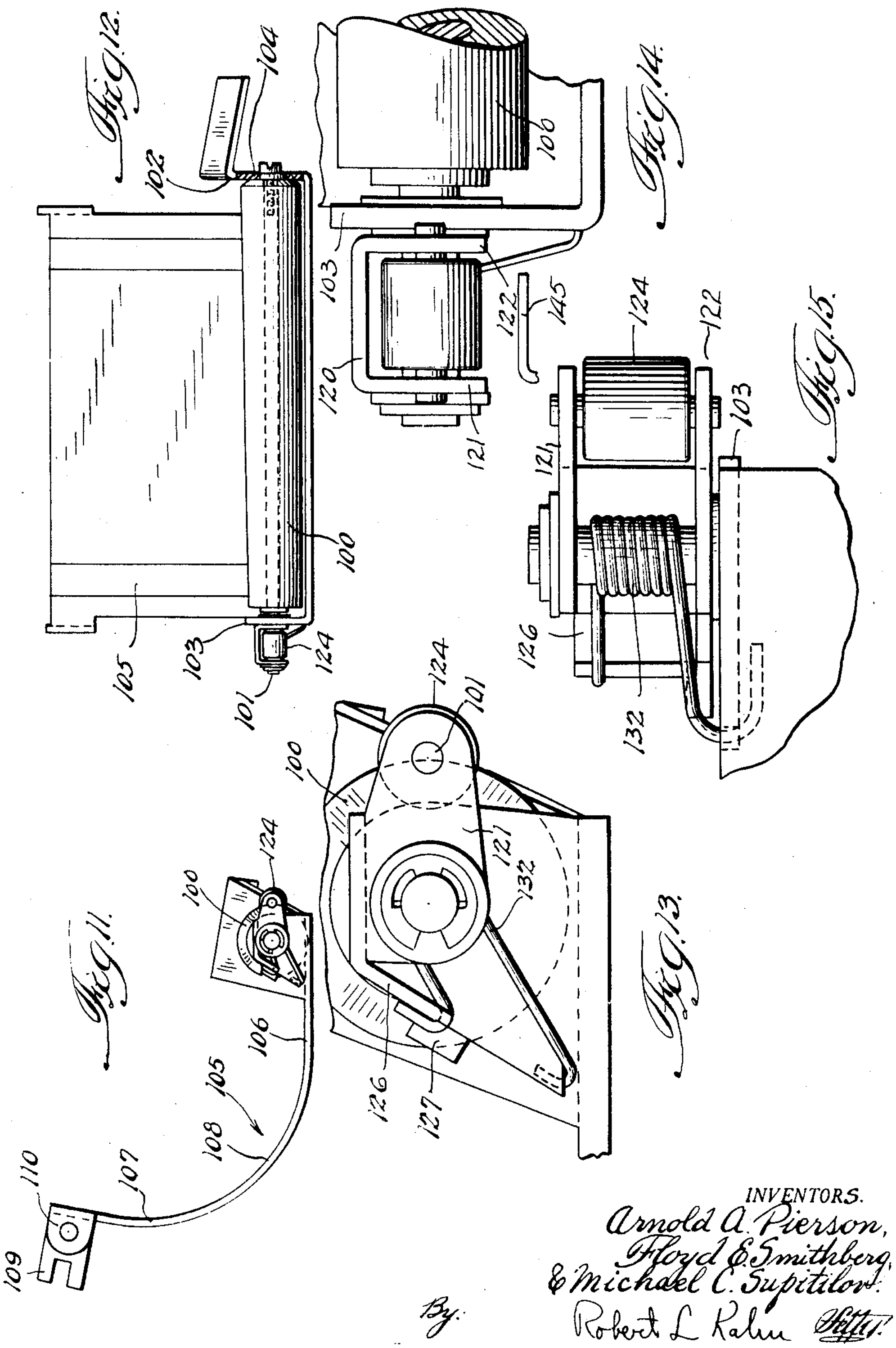

Figure 11 is a detail of the rocker plate carrying the record belt tensioning roller.

Figure 12 is a detail of the rocker plate illustrated in Figure 11 but showing this plate and roller in elevation.

Figure 13 is an enlarged detail of the locking and unlocking means for controlling the position of the record belt tensioning roller.

Figure 14 is a detail of the same parts as illustrated in Figure 13 but showing these parts in elevation.

Figure 15 is a top view of the parts illustrated in Figures 13 and 14.

Figure 16:
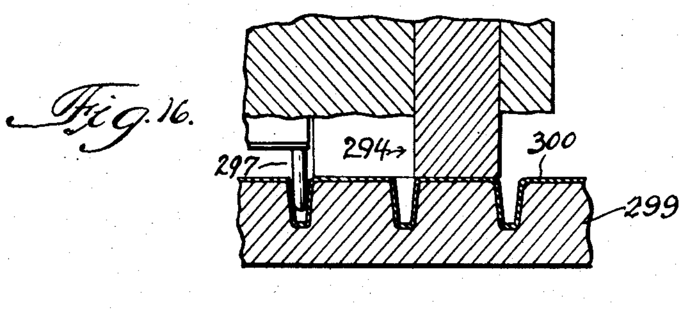

Figure 16 is an enlarged detail illustrating the cooperation between a portion of the record belt and the part of the transducer bearing upon said belt.

Figure 17:
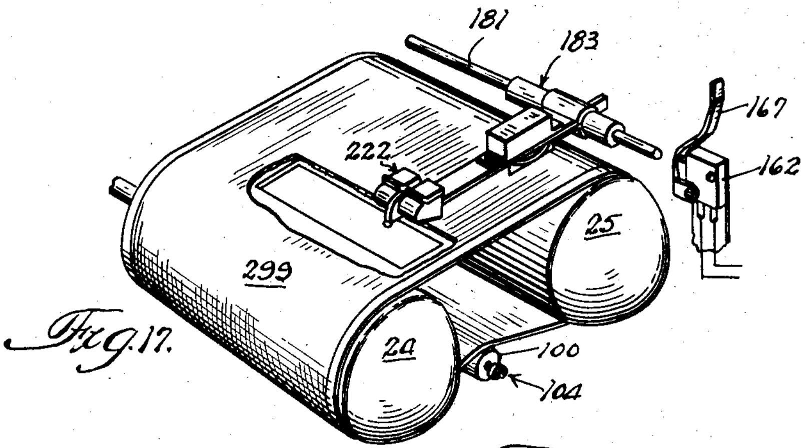

Figure 17 is an exploded view showing the record belt mandrels and tensioning roller together with the record belt and transducer and marker means and the carriage for the same.

Figure 18:
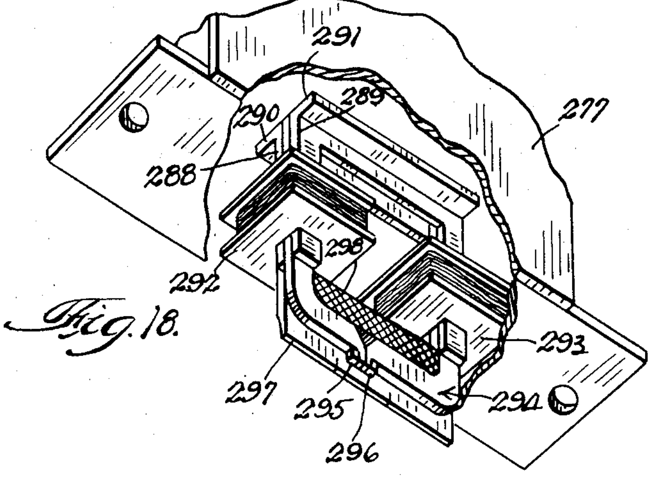

Figure 18 is an enlarged detail of a transducer which may be used in the new machine.

Figures 19, 20, 20A:
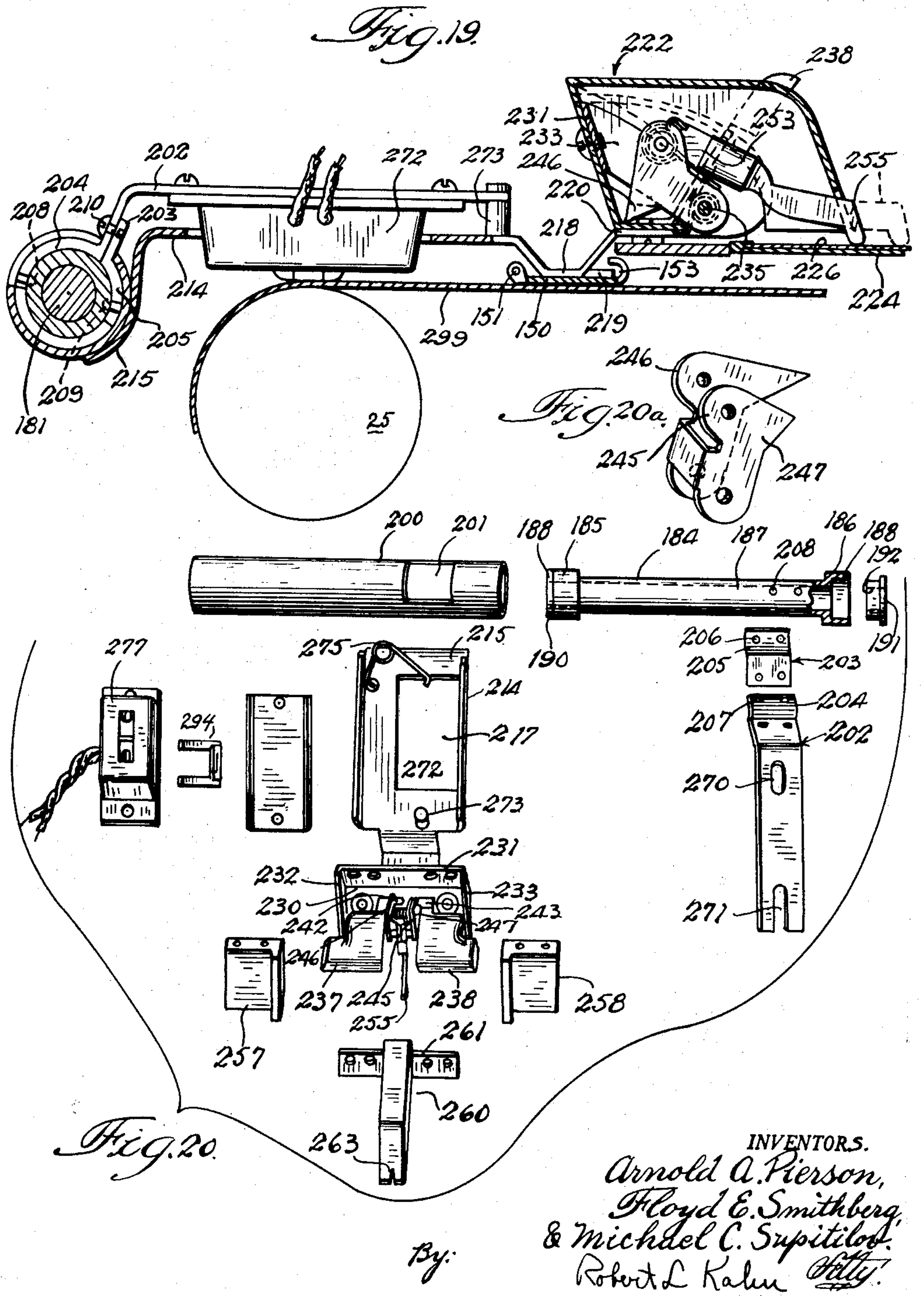

Figure 19 is an enlarged view partly in section illustrating the support means for the transducer and marker mechanism and showing the marker mechanism.

Figure 20 is an exploded view of the various pieces making up the transducer and marker assemblies together with their supporting means.

Figure 20*a* is a perspective detail of a part of the marker mechanism illustrated in Figure 20.

Figure 20B:
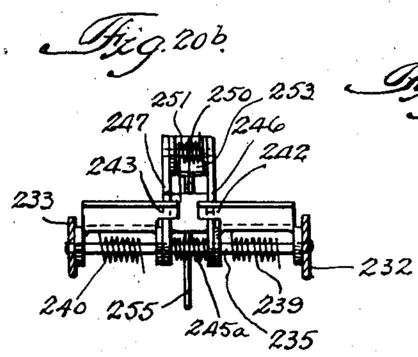

Figure 20*b* is a view from the rear of the marker mechanism illustrated in Figures 19 and 20.

Figure 21:
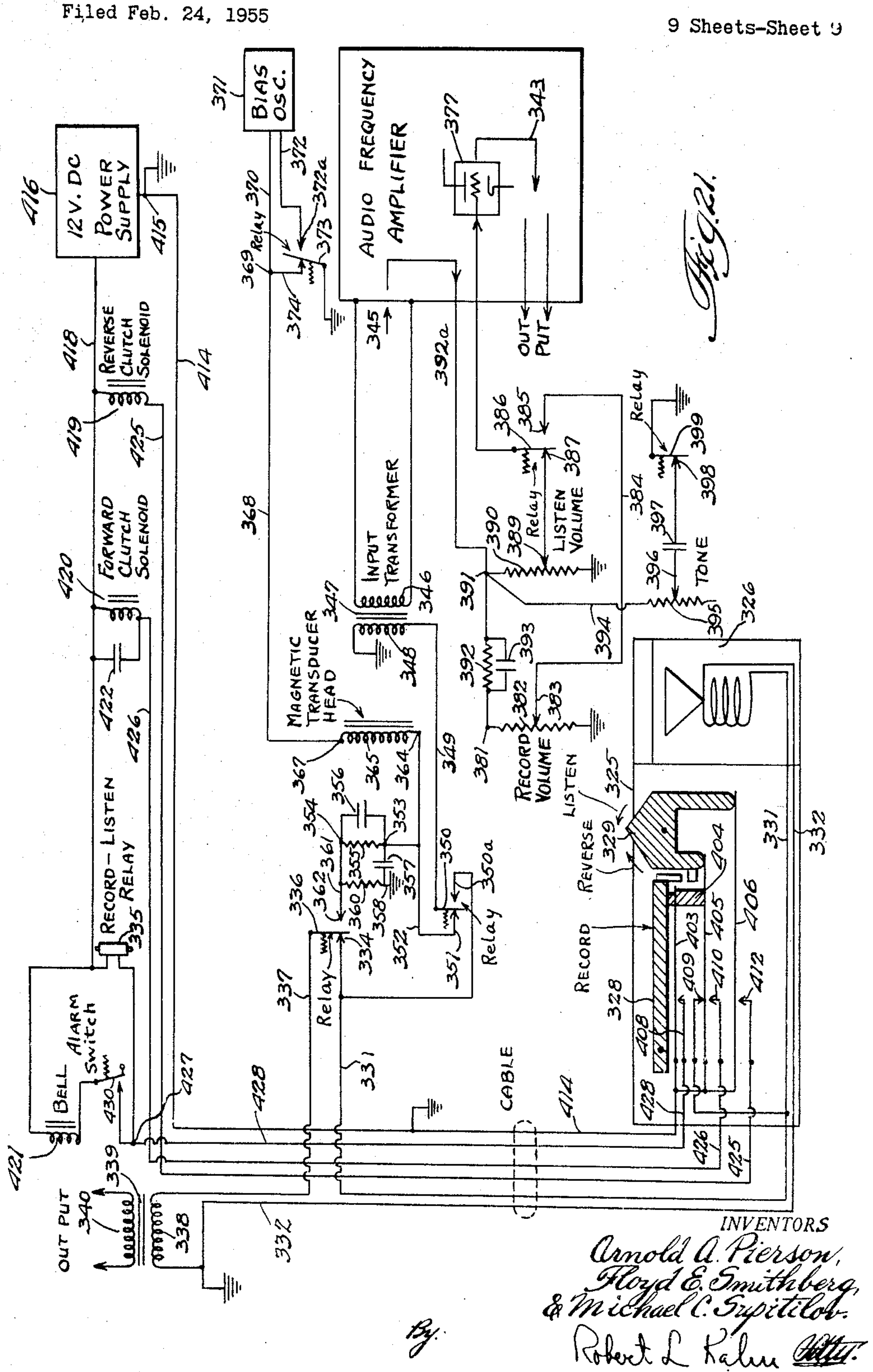

Figure 21 is a schematic view of the electrical portion of the recorder-reproducer, the electrical motor and motor circuit for driving the record belt and the power supply and details of the audio-frequency amplifier and oscillator being omitted.

The dictating machine exclusive of microphone is carried on a generally flat base 10 upon which the components of the machine are secured or supported.

Referring to Figure 1, electric motor 12 is carried upon base 10 at the left rear corner thereof. Motor 12 is of the type customarily used in dictating machines and may be an induction type alternating current motor running at a substantially constant speed. Capacitor 13 is secured to the base and this capacitor may be connected to one of the windings of motor 12 for phase-splitting purposes. The speed of motor 12 is adapted to be controlled by a suitable rheostat 15 having adjustment disc 16. It is understood that the various parts so far described are suitably connected by wiring running along base 10. Between motor 12 and motor capacitor 13 is can 18 containing power transformer and forming part of a power supply for the amplifiers. Various parts of the electronic portion of the system such as vacuum tube amplifiers, capacitors and transformers are distributed over base 10 to provide a compact arrangement.

For example, controls **19*a*, 19*b* are provided for on-off switching and volume control. In addition, microphone-speaker assembly 20** having Forward, Reverse and Listen controls is provided. The microphone-speaker assembly is connected by cable to the main chassis.

Rigidly attached to base 10 is casting 22 providing a generally flattened horizontal region 23 within which a record belt and mandrels are disposed. For convenience, casting 22 may be referred to as a mandrel housing. Within region 23 in spaced parallel relation are record belt supporting mandrels 24 and 25. These mandrels have cylindrical bodies and blunt bullet-shaped tips 26 and 27 forming the outer ends of the mandrels. These outer ends of the mandrels are accessible from the open end of mandrel housing 22 so that a record belt may be disposed on or removed from the mandrels in a manner to be later explained. Mandrels 24 and 25 have outwardly disposed shoulders 29 and 30 (Fig. 7) respectively at the inner ends of the mandrels, these shoulders functioning as stops for the record belt. The mandrels carry stub shafts rigidly attached thereto and extending from the inner ends of the mandrels only.

Referring to Figure 8, mandrel 24 is shown as being provided with stub shaft 31. Mandrel 25 is similarly constructed and the stub shaft is similarly supported. For convenience, the detailed bearing construction for supporting mandrel 24 and fully illustrated in Figure 8 will be described, it being understood that the stub shaft and bearing are the same for mandrel 25. Certain differences relating to the clutch and drive wheel for the two mandrels are illustrated in Figure 7.

The two mandrels are rotatably supported at the inner ends thereof in a vertically disposed auxiliary plate 33 which is rigidly secured to base 10 and to mandrel housing 22 by bolts. Auxiliary plate 33 is suitably apertured and, as illustrated in Figure 8, has bushing 34 for each mandrel. Bushing 34 is of suitable material such as brass or the like and consists of sleeve portion 35, external shoulder 36 and journal portion 37. Journal portion 37 is fitted in the aperture in auxiliary plate 33, as by a drive fit, so that the journal portion is tight. Journal portion 37 may conveniently extend somewhat beyond that surface of auxiliary plate 33 facing the inner end of the mandrel to function as a spacing shoulder and provide clearance between the inner end of the mandrel and the opposed face of auxiliary plate 33. External shoulder 36 will lie against the outer face of auxiliary plate 33, thus providing a convenient stop for determining the depth to which sleeve 34 is driven into apertured plate 33.

Rotatively disposed over sleeve portion 35 is pulley 39. Pulley 39 has crowned belt-engaging surface 40 bounded by end flanges 41 and 42. Pulley 39 also has body portion 44 extending beyond flange 41, this being the side of the pulley remote from auxiliary plate 33.

It will be noted that pulley 39 in Figures 7 and 8 has a comparatively small diameter, this pulley going with mandrel 24. Pulley 39' for mandrel 25 is a simple flat pulley having no crown and no external flanges. Pulley 39' for mandrel 25 also has a larger outside diameter than pulley 39 for mandrel 24. The difference in pulley diameters for the two mandrels is for the purpose of obtaining different belt speeds for forward or reverse belt drive. If pulleys 39 and 39' are driving members, then through the action of clutch mechanism to be described mandrel 24 or mandrel 25 will be driven. If mandrel 24 is driven from pulley 39, then mandrel 25 will be an idler as far as the record belt is concerned and the record belt will be driven in reverse direction at one speed. If pulley 39' is to be effective for mandrel 25, then mandrel 25 will be driven at a reduced speed to drive the belt forward during recording or listening. The relative diameters of pulleys 39 and 39' may vary within wide limits depending upon desired characteristics.

A clutch for controlling the drive between pulley 39 and mandrel shaft 31 is illustrated in detail in Figure 8. Extension body portion 44 of pulley 39 has a smooth outer cylindrical surface 45, this surface extending to flange 41. At the junction of outer surface 45 and flange 41 there is provided recess 47 into which the bent end 48 of coil spring 49 may be disposed. Coil spring 49 is a helical spring preferably of rectangular wire, the spring having sufficient turns to extend beyond the end of pulley body 44. As illustrated in Figure 8, the diameter of outer surface 45 is large enough in comparison to the inside diameter of coil spring 49 so that the various turns of the coil spring overlying body 44 have a tendency to hug surface 45. As will be apparent later, however, the coils of spring 49 may clear surface 45 if desired.

Stub shaft 31 for the mandrel extends beyond portion 44 of the pulley and carries at its end driven member 51. Driven member 51 is rotatively locked to stub shaft 31 by any suitable means such as, for example, pin **51*a*. Driven member 51 has cylindrical portion 52** whose outer diameter is smaller than the inside diameter of the coil spring in a normal untensioned condition.

As illustrated in Figures 7, 7*a* and 8, driven member 51 has slotted end portion 53 consisting of two spaced parallel members 55 and 56 between which there is formed transverse slot 57. Disposed within slot 57 are opposed bell cranks 59 and 60 carried by pins 61 and 62 extending transversely through members 55 and 56. Pins 61 and 62 are parallel to each other, are perpendicular to the axis of stub shaft 31, and are offset symmetrically from the axis.

The bell cranks are thus secured in such fashion that portions 64 and 65 of the bell cranks may move outwardly with respect to the axis of the stub shaft. Portions 64 and 65 of the bell cranks overlie portion 53 of the driven member 52. The outer surfaces of bell crank portions 64 and 65 ordinarily may be flush with the extension of the surface defined by the active face of driven member 52. Coil spring 49 has turns extending over portions 64 and 65 of the bell cranks. Clutch engagement may be obtained by moving the bell cranks so that portions 64 and 65 move outwardly to engage the inside surfaces of the coil spring.

In such a type of clutch, when some engagement between bell crank portions 64 and 65 on the one hand and the end turn of the coil springs on the other hand occurs and assuming that the direction of rotation and direction of the coil spring both correspond, there will be a tendency to wind the coil spring tightly so that clutch engagement with driven member 52 results for power transmission.

In order to effect such movement of the bell cranks, button 67 is provided. This button is disposed axially of stub shaft 31 and has a shoulder construction 68 cooperating with undercutting on bell cranks 59 and 60. Button 67 has recessed end 70 axially alined with stub shaft 31. Coil spring 71 is disposed within recess 70 and extends between the button and the end of stub shaft 31 to provide the spring bias for maintaining the bell cranks in a position illustrated in Figure 8 where no clutch engagement occurs.

To effect clutch engagement, it is necessary to press button 67 or 67', as the case may be, toward stub shaft 31 or 31'. Inasmuch as mandrels 24 and 25 are to be driven in opposite directions by virtue of the action of their respective clutches (it is understood that the idler mandrel will be driven in the same direction as the driven mandrel because of the action of the record belt) it will be necessary to have springs 49 and 49' of opposite pitch. Other than that and the diameter of the pulley portions, the two clutches for the two mandrels may be identical in construction.

Electromagnetic means are provided whereby only one of the two clutches may be actuated at any time. This means includes double solenoid 75 having alined windings 76 and 76' respectively. A soft iron magnetic core structure is disposed outside the windings. Within the windings near the center thereof is a magnetic core structure having externally extending part **77*a* extending to the external core structure and oppositely directed conical parts 77*b* and 77*c*. Armatures 78 and 78' are coupled to actuators 79 and 79' rockable about vertical axes. Armatures 78 and 78' are connected together by rod 78*a* slidable in conical parts 77*b* and 77*c*. The actuators carry adjusting members 80 and 80' to engage buttons 67 and 67' respectively. Upon energization of winding 76 or 76', the cooperating armature will be actuated for pressing button 67 or 67'** and effecting clutch engagement. The mechanical construction provides an interlock preventing simultaneous actuation of the two clutches. The electrical connections for controlling the machine will be described later and also prevent simultaneous energization of the two clutches.

Figure 6:
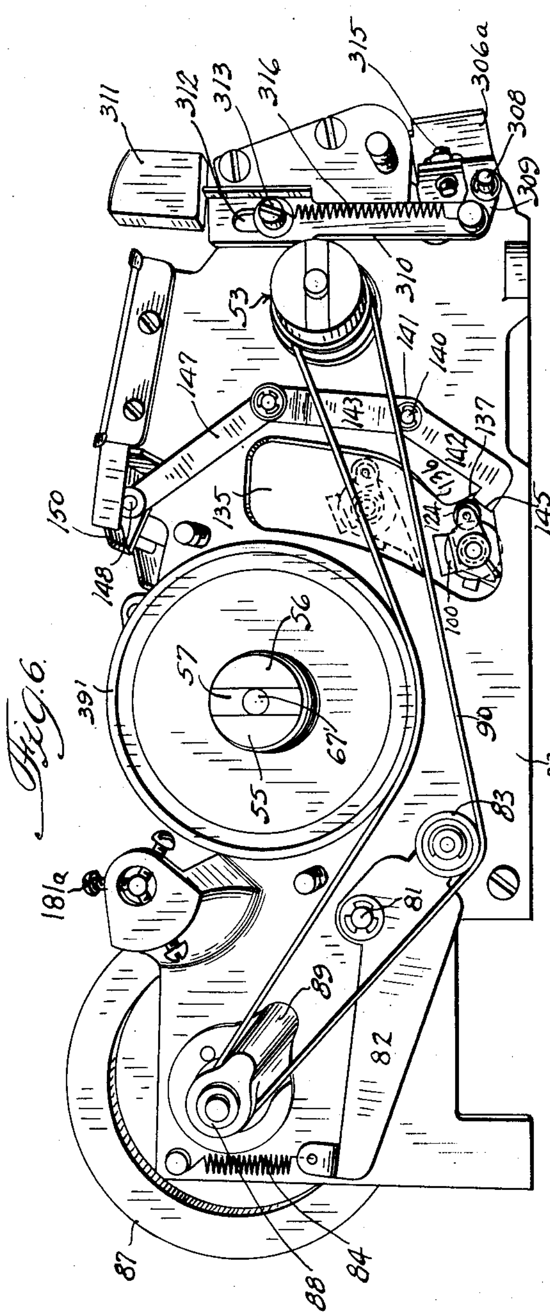
Figure 6 is a perspective view of a portion of the machine illustrated in Figures 2 to 4 inclusive and showing the belt drive for the mandrels and one end of the record belt tensioning roller support.

Referring now to Figures 6 and 7, auxiliary plate 33 has secured thereto pivot pin 81 rotatively supporting lever 82. Lever 82 carries idler pulley 83 carried on a pin for rotation, idler pulley 83 being disposed somewhat below large pulley 39'. Lever 82 has the end opposite the idler pulley biased upwardly by spring 84 extending between the end of the lever and a pin carried by auxiliary plate 33.

Auxiliary plate 33 also has journaled therein a shaft carrying drive pulley 86 on one side of auxiliary plate 33 and large pulley 87 on the other side therof. The shaft upon which pulleys 86 and 87 are mounted is supported by journal 88 carried by bracket 89 extending from plate 33. As will be clear from Figure 7, pulley 86 is on the same side of auxiliary plate 33 as mandrel pulleys 39 and 39′. Pulley 86 is crowned and flanged similarly to pulley 39 and drives belt 90. Belt 90 extends around pulley 86, below idler 83 and around pulley 39 and thence extends below pulley 39′ to engage the part of pulley 39′ which is below the mandrel shaft.

Belt 90 requires the inside and the outside faces thereof as driving surfaces and accordingly belt 90 is preferably made of plastic or suitable flexible material having both surfaces adequately treated. The various pulleys and idlers are made of suitable material. Pulleys 39 and 86 are both crowned and flanged to maintain belt 90 in position for driving at all times. It will be understood that the pulleys and idlers engaged by belt 90 are suitably alined and positioned for effective cooperation with the belt. Pulley 87 is connected by belt 92 to motor pulley 93 on the shaft of motor 12.

The record belt for use with the new machine is of plastic having a guide track preformed therein. The belt is of suitable material having a magnetizable coating thereon. An example of a coated belt which may be used with the new machine is disclosed and claimed in the co-pending application of Michael C. Supitilov, Serial No. 437,541, filed June 17, 1954. This belt may have the guide track embossed therein as disclosed and claimed in the co-pending application of Michael C. Supitilov, Clifford E. Johnson and Oliver W. Norton, S.N. 429,842, filed May 14, 1954.

In order to maintain a record belt in proper position upon mandrels 24 and 25, it is necessary to have the axes of the two mandrels parallel and also have the surfaces of mandrels 24 and 25 true. In addition, it is also necessary to have the record belt true. In quantity production these characteristics are difficult to achieve without rendering the machine complicated and expensive to manufacture. It is essential, however, that the record belt be retained in a predetermined fixed position with respect to the ends of the mandrels and it is also desirable that the record belt be endowed with a tendency to move toward such correct position if not previously correctly positioned. Accordingly, shoulders 29 and 30 on mandrels 24 and 25 are provided to limit the travel of the belt toward auxiliary plate 33 and means are provided for generating a gentle force tending to move the belt toward shoulders 29 and 30 and retain the belt against the shoulders during mandrel rotation.

In a magnetic recording and reproducing machine, reverse belt travel is possible and desirable for back-tracking in connection with repeating. In the case of stylus type recorders and reproducers, reverse travel of the record medium is not possible. Hence in a magnetic recording and reproducing machine such as disclosed here, if reverse belt travel is desired, it is necessary to maintain a proper record belt position upon the mandrels in either direction of belt travel.

Figures 4, 5:
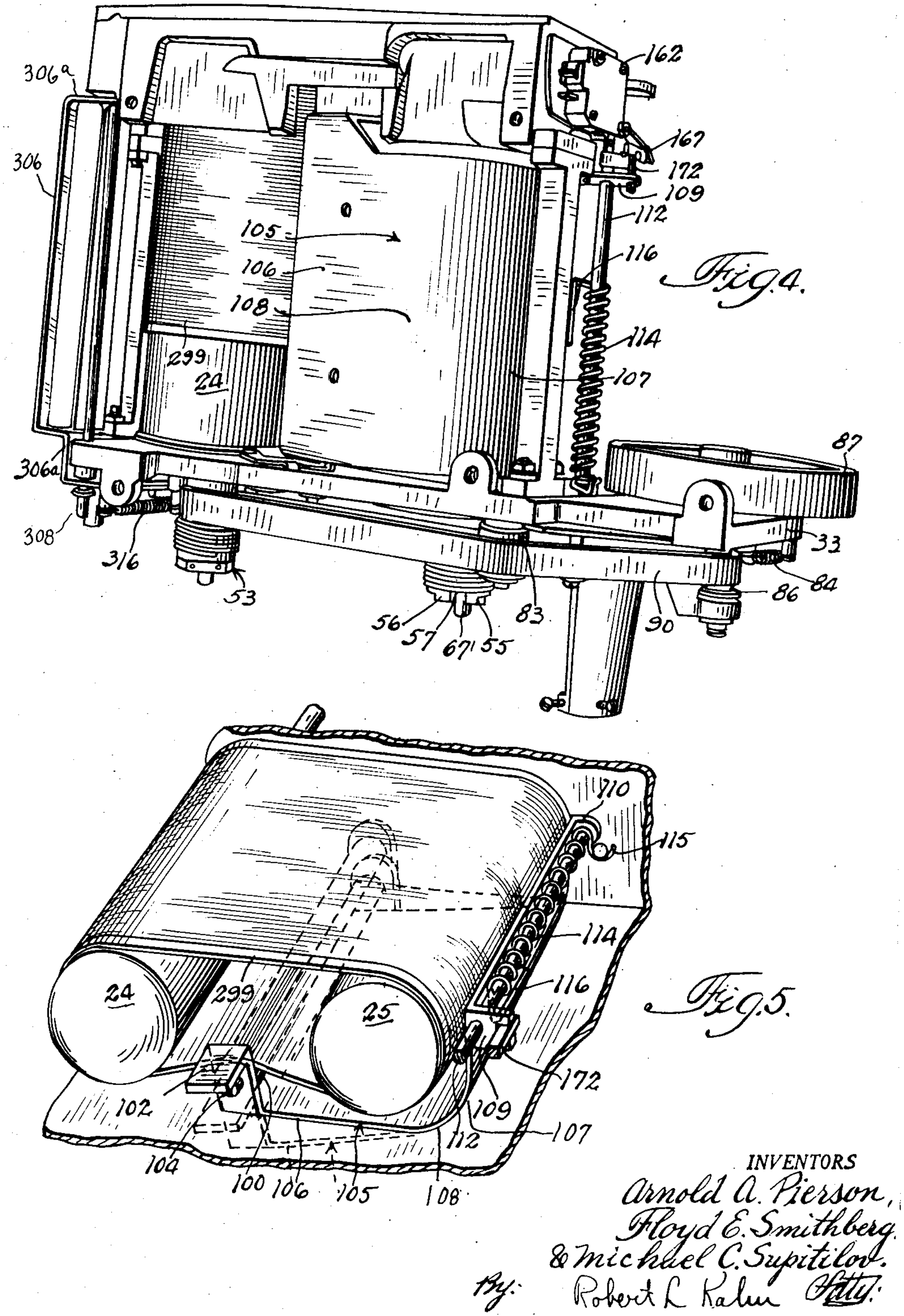
Figure 4 is a perspective view from the bottom of the portion of the machine illustrated in Figures 2 and 3.
Figure 5 is a perspective view of the mandrels and record belt together with the tensioning means of the new machine.

For tensioning and guiding the record belt to assume and maintain a proper position on the mandrels there is provided record belt idler 100 (Figures 5, 9, 12). Idler 100 cooperates with the unsupported portion of the record belt and preferably cooperates with the lower length of the record belt. Thus as illustrated in Figure 9, idler 100 cooperates with the outside or coated surface of the belt. Idler 100 is so designed that it imparts unequal belt tension along the width of the belt. The tension at the edge of the belt nearest the bullet-shaped mandrel tip, which for convenience may be designated as the outer belt edge, is a maximum. The belt tension generated by record belt idler 100 is reduced until it is a minimum at the inner edge of the belt, this being the edge adjacent the shoulders on the mandrels.

The variation in belt tension may be obtained by having a cylindrical idler so mounted that the idler axis is tilted as illustrated in Figure 9, or by having the idler on an axis generally parallel to the mandrel axes but having the idler surface as the frustum of a cone with the large end cooperating with the belt at or near the outer edge of the belt. In either case, record belt idler 100 will tend to generate a force in the belt urging the belt against shoulders 29 and 30 of the mandrels.

By having the axis of the idler lie in a plane parallel to the axes of the two mandrels, the force generated by the idler on the belt urging the belt toward the shouldered ends of the mandrels will be substantially the same in either direction of belt travel. The amount of tilt of the idler axis or the amount of taper of idler 100 may be small. It is not desirable to generate an excessive force on the belt tending to move the same against the mandrel shoulders since driving power from the motor would be wasted and there would be a substantial tendency to stretch the belt over the shouldered ends of the mandrels.

Idler 100 is rotatively supported on rod 101, which rod is supported in ears 102 and 103 of rocking plate 105. Ear 102 has part thereof formed as a finger piece. For adjusting the tilt of idler 100, eccentric screw 104 is provided in the outer end of rod 101. By turning screw 104 (Figure 17) with respect to rod 101, the outer end of rod 101 may be raised or lowered.

Rocking plate 105 preferably extends the full width of the belt and comprises (Figure 5) body portion 106 and upwardly extending portion 107 connected by curved portion 108. The rocking plate has pivot ears 109 and 110 bent at right angles to portion 107, the ears being at opposite edges of the rocking plate. Ears 109 and 110 are apertured and have pivot rod 112 extending through the same. Pivot rod 112 is suitably secured between mandrel housing 22 and auxiliary plate 33. Pivot rod 112 is disposed to the rear of mandrel 25. Disposed around pivot rod 112 is coil spring 114 having fixed end 115 anchored to a pin on plate 33 and having movable end 116 resting against the adjacent outer surface of the rocker plate. As illustrated in Figure 5, coil spring 112 tends to bias the rocker plate so that the plate is urged in a direction to move record belt idler 100 up into the space between the mandrels.

Record belt tensioning idler 100 has its inner end short of auxiliary plate 33 and idler support rod 101 projects into a cut-out in auxiliary plate 33 (Figures 6 and 11 to 15 incl.). This free end portion of rod 101 carries U-shaped bracket 120 having sides 121 and 122 through which rod 101 passes. Sides 121 and 122 of bracket 120 also support roller 124. Bracket 120 has tail piece 126 which cooperates with stop 127 formed from rocking plate 105. Spring 132 coiled around rod 101 has one end anchored to rocking plate ear 103 and the other end anchored to tail piece 126, the coil spring tending to rock bracket 120 clockwise as seen in Figure 6. The tail piece and stop cooperate to limit the movement of bracket 120 in response to the spring bias.

Bracket 120 operates within cut-out 135 in auxiliary plate 33. Cut-out 135 may have any desired shape and has the lower right-hand part of the cut-out as seen in Figure 6 provided with cam portions 136 and 137. Cam portion 136 extends downwardly and rearwardly of the machine while cam portion 137 extends downwardly and forwardly of the machine. Bracket 120 and roller 124 are so arranged that roller 124 will engage cam portion 137 as illustrated in Figure 6 whereby the idler roller is maintained down at the base of the machine and clear of the record belt. The tendency for rocker plate 105 to move the idler up, as seen in Figure 6, is kept in check by the tendency of roller 124 to catch against cam surface 137, thus locking rocker plate 105 in the down position.

Means are provided for unlocking the rocker plate, such means acting upon roller 124 and tending to cause roller 124 to travel upwardly along cam surface 137.

Pivotally disposed on pivot pin 140 (Figure 6) carried by auxiliary plate 33 is bell crank 141 having arms 142 and 143 respectively. Arm 142 extends downwardly and has tripping finger 145 bent to extend into the cut-out in auxiliary plate 33. Tripping finger 145 is disposed in proximity to cam surface 137 and is shaped so that it may be under roller 124 on bracket 120 when the bracket is in the locking position as illustrated in full lines in Figure 6. By rocking bell crank 141 clockwise as seen in Figure 6, tripping finger 145 will exert an upward force upon roller 124 and move bracket 120 against its spring bias counter-clockwise. This will cause roller 124 to ride up on cam surface 137. When roller 124 has moved up above cam surface 137, bracket 120 and roller 124 are free and rocking plate 105 may respond to the bias of coil spring 114 and elevate record belt idler roller 100. When rocking plate 105 is moved to the locking position, cam surface 136 guides roller 124 so that the roller and bracket will be prepared to assume a locking position. When rocking plate 105 is unlocked and when a belt is engaged by tensioning roller 100, the clearance between roller 124 and the cut-out part of plate 33 will permit rocking plate 105 to float and gives free play to the belt-tensioning means.

Bell crank 141 has arm 143 pivotally secured to link 147. Link 147 has the upper end thereof pivotally secured at 148 to an ear of unlocking rocker plate 150 (Figures 1, 3, 5, 6 and 19). Unlocking rocker plate 150 is pivotally secured on pin 151 carried between the outer end of mandrel housing 22 and auxiliary plate 33. Unlocking rocker plate 150 has its front edge bent back upwardly to provide a rearwardly directed generally horizontal guide channel 153 transversely of the machine. Spring 154 coiled around pin 151 has one end anchored to mandrel housing 22 and the other end bearing upon unlocking rocker plate 150 to bias the plate downwardly. Spring 154 is weaker than spring 132 to permit stable locking of rocker plate 105 in the down position. Through the linkage between the unlocking plate and tripping finger 145, the spring bias on unlocking rocker plate 150 will cause tripping finger 145 to be normally biased to an up position. When rocking plate 105 and belt-tensioning idler 100 are locked in the down position as illustrated in Figure 6, tripping finger 145 will be in a down position and unlocking rocker plate 150 will be rocked upwardly. In order to unlock the record belt tensioning idler from an inactive position, a downward push on unlocking rocker plate 150 on its pivot will transmit force to finger 145, causing roller 124 to be pushed up clear of locking cam surface 137. This will unlock rocker plate 105 and permit plate 105 to respond to its spring bias.

Means cooperating with rocking plate 105 are provided for sounding an alarm in the event that record belt tensioning idler 100 is in a locked position, clear of a belt, or if the idler is unlocked and no belt is in the machine. Referring to Figure 5, ear 109 forming part of rocking plate 105 has slotted portion 160 (Figures 10 and 11). Rigidly attached to mandrel housing 22 is switch body 162 having switch operating pin 163 (Figures 10–10-B). Body 162 contains an electric switch within the same, which switch may be normally opened and which is adapted to be closed by pressing pin 163 into the body. An example of such a switch is the one available in the market under the trade name "Microswitch." That and similar switches may be operated with a comparatively small movement of pin 163.

Rigidly attached to switch body 162 are ears 164 carrying pivot pin 165. Disposed on pivot pin 165 is spring finger 167. Finger 167 is adapted to have a limited movement around pivot 165. Carried by switch body 162 is bracket plate 169 upon which is secured pivot pin 170. Rockable about pivot pin 170 is finger piece 171 having finger 172. Finger piece 171 carries pivot pin 174 upon which there is secured arm 175. Arm 175 has cut-out 176 adjacent pin 170 and has actuating part 178 for cooperation with a part of spring finger 167.

Normally when finger 172 is generally horizontal, member 175 will be generally vertical. If finger 172 is rocked upwardly, pivot pin 174 will be moved to the left as seen in Figure 10–B and cause actuating part 178 to move to the left and engage spring finger 167. If spring finger 172 is moved downwardly, the rocking of finger piece 171 about pivot 170 will cause pivot pin 174 to be moved to the right as seen in Figure 10–A. The engagement of pin 170 and the cut-out portion of member 175 will cause actuating part 178 to move toward the left for actuating spring piece 167. Thus whether finger piece 172 is moved up or down from a normal horizontal position, the result will be the same, namely, movement of spring 167 to the left and actuation of switch pin 163.

The various parts are so proportioned that when record belt tensioning idler 100 is in normal belt-engaging position as illustrated in Figure 5, finger 172 will be generally horizontal and will not actuate spring finger 167 of the alarm system. If record belt tensioning idler 100 is locked in the down position clear of the belt, finger 172 will be moved up above the normal horizontal position to the no-tension position, as illustrated in Figure 10–B, to sound an alarm. If belt-tensioning idler 100 is unlocked but does not engage because of the absence of a belt, rocking plate 105 will move the belt idler up excessively and move finger 172 down and again sound an alarm (Figure 10–A). Assuming that there is a record belt on the mandrels and that the tensioning idler is raised from the locking position, then if the belt is improperly positioned, finger piece 102 for the belt-tensioning idler will be engaged by the belt and prevent the tensioning idler from moving up to a proper position. This will also cause finger 172 to be above its normal horizontal position (Figure 10–B) and will sound an alarm.

Assuming that the record belt is properly positioned and the record belt-tensioning idler properly engages the belt, a carriage associated with the transducer head will engage the tip of switch actuating finger 167 and sound an alarm when the end of the record has been reached. In the latter case, the lever mechanism operated by finger 172 will not be used, the alarm being sounded because of the engagement of spring finger 167 and the carriage of the machine (Figure 10).

Supported between a boss on mandrel housing 22 and a bracket carried by auxiliary plate 33 (Figures 1, 2, 3, 17, 19) is horizontal guide rod 181. Guide rod 181 has its axis parallel to the mandrel axes and supports sliding carriage 183. Carriage 183 is slidable along rod 181 and carries the transducer head and marker mechanism. It is desirable to eliminate rocking of slidable carriage 183 upon rod 181. Accordingly, bearing members for engaging the guide rod are disposed at the ends of the carriage, the carriage length being great enough to provide a broad, steady base. It is understood that guide rod 181 is of suitable material as steel and is smoothly finished. The bearing means for supporting the ends of rod 181 may be provided with independent adjustments for moving the bearing position in space. This will permit rod 181 to be adjusted to true parallelism with the mandrels. The drawings show three screws **181*a* at one end for this purpose. The screws work in tapped apertures. This centering means may be provided for both ends of rod 181**.

Referring to Figure 20, carriage 183 is shown in exploded form. The carriage consists of inner tube 184 of suitable metal such as brass, tube 184 having shoulders 185 and 186 at the two ends thereof. Tube 184 has a smooth interior bore 187. The two ends of inner tube 184 are counterbored at 188 so that the inside diameter thereof is somewhat larger than the bore of inner tube 184. Slipped into the ends of inner tube 184 are bearings 190 and 191. These bearings are so shaped that they may be pressed into the counterbored openings in the ends of the inner tube 184, the bearings providing bearing surfaces 192 which have a somewhat smaller inside diameter than the inside diameter of bore 187 of inner tube 184. Bearings 190 and 191 will engage the finished surfaces of stationary rod 181. Inner tube 184 clears rod 181.

Bearing members 190 and 191 are preferably formed of an oil-impregnated or graphite-impregnated composition available in the market, such bearings requiring no oiling. By providing a substantial distance between bearings 190 and 191, any slight rocking of the carriage upon rod 181 will have negligible effect upon the transducer head.

The transducer head and marker assembly to be described later are secured to the portion of the carriage near the right-hand end thereof as seen from the front of the machine (Figure 1).

Disposed around the outside of inner tube 184 is outer tube 200. Outer tube 200 is adapted to ride upon end shoulders 185 and 186 of the inner tube for bearing surfaces. Outer tube 200 has window 201 through which support members 202 and 203 may extend for engagement with inner tube 184. Support members 202 and 203 are clamped to the inner tube of the carriage and support the transducer. Support members 202 and 203 have curved ends 204 and 205 with fingers 206 and 207 at the ends thereof. Fingers 206 and 207 engage recesses 208 and 209 in inner tube 184. Bolt means 210 are provided for drawing support members 202 and 203 together tightly so that they may grip inner tube 184.

It is understood that the clearance between the inner and outer tubes is sufficient to accommodate curved portions 204 and 205 so that the inner tube may be rocked with respect to the outer tube around their common axis.

Rigidly attached to the outer surface of outer tube 200 is marker-supporting arm 214. Arm 214 has curved portion 215 which conforms to the curved surface of the outer tube. Outer tube 200 and curved portion 215 may be joined by soldering or brazing or by screws. Arm 214 has window 217 through which the transducer head extends. Arm 214 has hooked portion 218 (Figure 19) adapted to ride along the upper face of unlocking rocker plate 150. Finger 219 extends from hooked portion 218 and locks in rearwardly directed guide channel 153 to limit upward movement of hooked portion 218. Beyond hooked portion 218 is marker support end 220 carrying marker mechanism 222. The marker moves with the carriage back and forth, the marker itself travelling over strip support plate 224 (Figures 1, 2 and 19) rigidly attached to the machine. Plate 224 has turned over edges for accommodating marking strip 226 of special paper to receive special directions. As is well known, such paper strips may have check marks produced thereon to indicate the beginning or end of a letter, correction, or the like. Usually long and short markings transverse to the length of the paper are relied upon for indicating the beginning of a letter or correction respectively.

The marker mechanism (Figures 1, 2, 19, 20 and 20*b*) includes base plate 230 having rear face 231 and end faces 232 and 233. End faces 232 and 233 have apertured projections in which there is disposed pin 235. Rockably mounted on pin 235 are finger pieces 237 and 238. Each finger piece is biased to an up position by a coil spring, springs 239 and 240 being provided. One end of each spring is anchored to base plate 230 and the other end of each spring bears against its corresponding finger piece. The finger pieces have tabs 242 and 243 extending toward each other at the rear parts of the finger pieces. Rockably disposed on pin 235 between the finger pieces is rocker 245 having sides 246 and 247. Between sides 246 and 247 and around pin 235 is coil spring **245*a* arranged so that rocker 245 is spring pressed in the same direction as finger pieces 237 and 238; i.e. toward rear face 231. Sides 246 and 247 overhang tabs 242 and 243. Side 246 is longer than side 247 so that in the normal position of the parts, side 246 will rest upon tab 242 while side 247 will be short of tab 243**.

Rocker 245 has pin 250 bridging the sides at the top thereof and has coil spring 251 disposed around the pin. One end of spring 251 is anchored against the rocker and the other end of spring 251 exerts a biasing force upon stylus support 253. The spring bias on stylus support 253 urges the support downwardly. Stylus 255 is mounted upon the stylus support.

When finger piece 237 is pressed down, its tab moves rocker 245 forwardly and thus causes the stylus to be moved forwardly. The length of rocker side 246 provides for maximum stylus movement and results in a long mark on the paper. Finger piece 238, when pressed, will not move the stylus as much due to the lost motion between its tab 243 and rocker side 247. Both finger pieces operate on the same stylus so that no alinement problem for two markers exists.

The marker mechanism is covered by shrouds 257 and 258 for the finger pieces and stylus shroud 260. The stylus shroud has mounting portion 261 adapted to fit against face 231 of the marker base plate 230. Small screws pass through registering apertures in face 231 and shroud mounting portion 261 and into threaded holes in the back of shrouds 257 and 258. Stylus shroud 260 has notch 263 in its front edge as a guide for the stylus.

Referring now to support member 202 (Figure 20), this is provided with elongated aperture 270 and slotted end 271 large enough to permit a transducer to be adjusted. Transducer 272 is attached by screws to support member 202. The transducer extends through window 217 in support arm 214. Slotted end 271 of the support member cooperates with pin 273 carried by support arm 214. Spring 275 carried by support arm 214 at the rear of window 217 provides a light pressure on the transducer for riding the belt surface.

The transducer illustrated in Figure 18 has casing 277 carrying laminations 288 and 289. These laminations have their top portions 290 and 291 bent at right angles to reduce height. Windings 292 and 293 are disposed on the lamination legs. Record-engaging lamination assembly 294 may be slipped in between the flat sides of laminations 288 and 289. The lamination has a thickness about equal to the land between record grooves. Lamination assembly 294 has active pole portions 295 and 296 soldered together to from a minute accurately dimensioned non-magnetic gap therebetween. Attached to assembly 294 is tracking blade 297 of non-magnetic hard material. Some solid non-magnetic material 298 may be disposed to retain the entire transducer intact and control the tracker blade spacing. Record belt 299 having magnetizable coating 300 is provided with preformed tracking grooves as indicated in Figure 16. Tracking blade 297 may be offset from lamination 294 by one or more record grooves.

Permanent magnet erasing means are provided. Referring to Figures 1, 2, 2*a* and 6, a leverage system is provided for moving a permanent magnet assembly into erasing position. While the erase means may assume a variety of forms, the example illustrated here is effective. Permanent magnet 302 of material like Alnico 5, for example, is provided. This magnet has its poles on opposite faces **302*a* and 302*b*. Non-magnetic spacers 303*a* and 303*b* of material like brass or plastic are disposed along the magnet sides between the pole faces. A U-shaped pole piece 304 of soft iron is disposed with the bight of the pole piece against pole face 302*b*. A U-shaped non-magnetic spacer 305 is disposed over magnet pole face 302*a* and the free edges of pole piece 304. The free edges of piece 304 are substantially flush with magnet pole face 302*a*. Spacer 305 has the sides overlapping the sides of pole piece 304. The assembly is maintained intact by springing pole piece 304 over the permanent magnet and lateral spacers 303*a* and 303*b* and springing non-magnetic spacer 305 over the free edges of pole piece 304**. The assembly is supported on rock arm 306 by bolts 307. These bolts may engage tapped apertures in non-magnetic spacer 303*b*. The location of these bolts outside of the effective magnet field for erasing makes it unnecessary to have non-magnetic bolts.

The erasing magnet assembly provides a magnetic field extending from pole face 302*a* to the two edges of pole piece 304 along the entire width of the record belt. Thus a belt portion travelling past the erasing field will encounter first a field of one polarity and then a field of opposite polarity. The intensity of the erasing field must be great enough to saturate the magnetizable coating on the belt.

The erasing magnet assembly is carried by fingers 306*a* extending from arm 306 at the ends and pivotally secured on pin 308 extending transversely across the front of the machine. Pin 308 is supported on bosses extending from casting 22 and plate 33. One finger 306*a* has extension 309 pivotally secured to vertically movable rod 310. Rod 310 has push-button 311 at the top end and the rod has slotted portion 312 engaging guide bolt 313 carried by casting 22 for guiding rod 310 in its vertical motion. Stop screw 315 carried by rock arm 306 is adjustable for limiting the final erasing position of the magnet assembly. The erase assembly is biased to an inoperative position by spring 316.

Figures 2, 2A, 3:
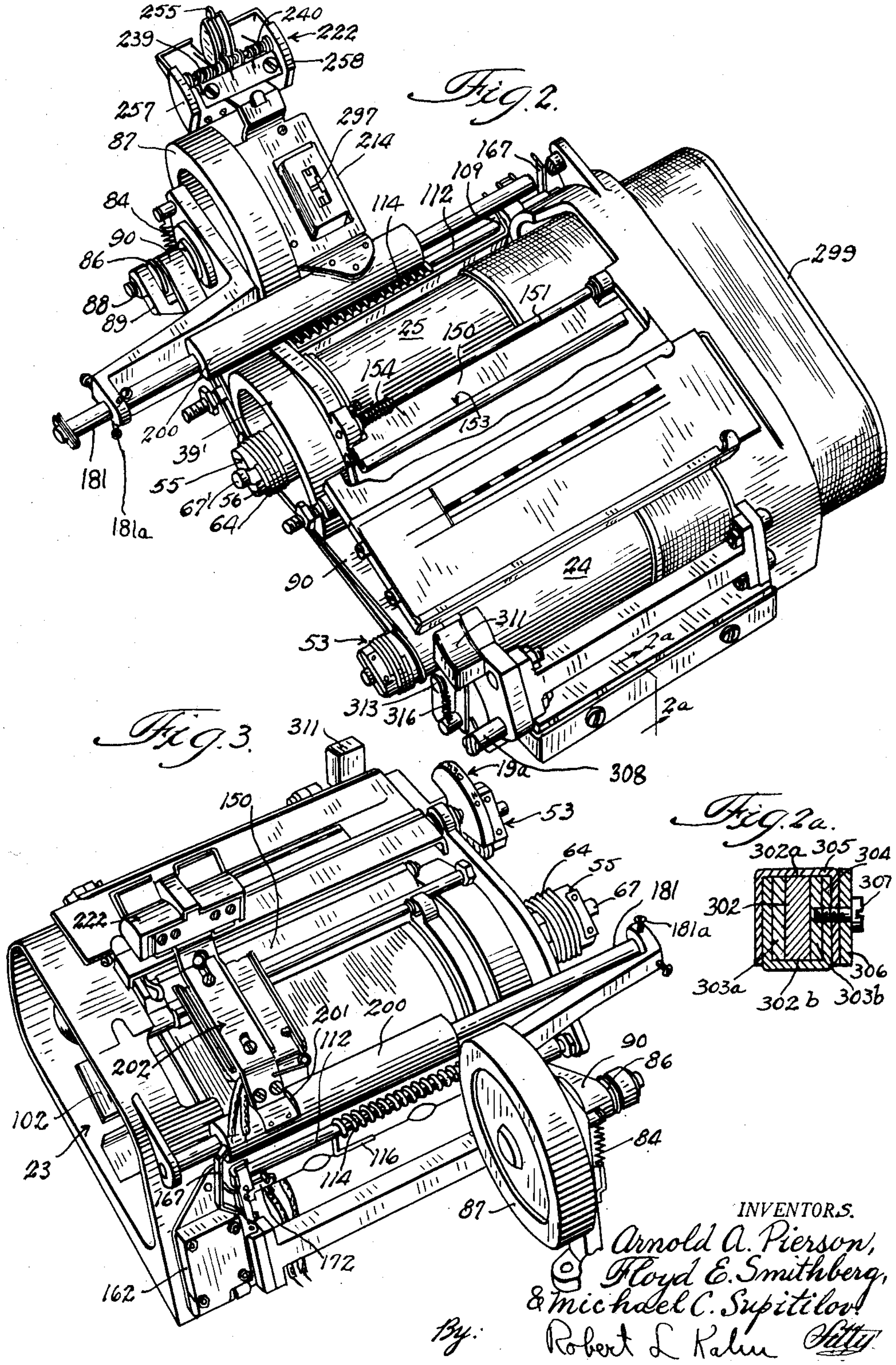
Figure 3 is a perspective view from the rear of the machine illustrated in Figures 1 and 2.

Pressing button 311 down will rock the magnet assembly upwardly and rearwardly into erasing position. As indicated in Figure 2*a*, the pole faces determined by the edges of pole piece 304 and pole face 302*a* lie in a generally flat plane or at least in a plane having a radius of curvature larger than the radius of curvature of the record belt on the mandrel. The erasing assembly is oriented so that in erasing position, with the belt travelling in reverse, the leading edge of all the edges of the magnet assembly will be closest to the belt coating. Thus if a transverse belt strip is assumed to be traveling in reverse direction, the following relations will be true. When the belt strip is opposite the leading pole face, the distance between the pole face and strip will be a predetermined minimum. When the strip is opposite the middle pole face, the separation between strip and pole face will be greater than the minimum. When the strip reaches the trailing pole face, the separation will be still greater than the minimum.

The minimum separation at the leading pole face is designed to produce saturation in the magnetizable coating. The separation at the trailing pole face is designed so that the magnetizable coating is magnetized sufficiently for the coating to have zero or negligible magnetization after leaving the trailing pole face. It is clear that the separation at the trailing pole face will in a measure depend uopn the intensity of magnetization due to the center pole face. This type of erase action is well known in this art.

While erasing will occur in either direction of belt travel, reverse belt travel has been selected as the preferred direction because of the higher belt speed and consequent quicker erasure of the entire belt.

Referring now to Figure 21, a schematic diagram of the electrical portion of this system, excluding the electric motor, is shown to illustrate the operation of the various parts of the machine. It is customary in dictating machines to provide a handset having a microphone and suitable switching means for controlling the machine. The handset is connected to the machine proper through a cable. For transcribing purposes, it is possible to provide remote control switching means for controlling the operation of the machine, the microphone in such case being omitted.

Referring specifically to Figure 21, handset 325, which may consist of a suitable casing of plastic or other suitable material, contains combined microphone and speaker 326 and switching means for controlling the recording and reproducing machine. The entire handset is connected through a cable. The switching means includes pivoted insulating member 328 and rockable insulating member 329. When member 328 is pressed downwardly, the machine is in Record condition with the belt travelling in the proper direction. When insulating block 329 is rocked to the right, reverse belt travel is provided while rocking to the left provides for listening. Members 328 and 329 are shaped to interlock and prevent simultaneous Record and Reverse operation.

Combined microphone and speaker 326 may be of any type such as, for example, electrodynamic, and has its terminals connected to wires 331 and 332. Wire 331 is connected to fixed normal contact point 334 of a Record-Listen relay, generally indicated by 335. For convenience, the Record-Listen relay is illustrated with the winding in one part of the circuit and the relay contacts disposed at a distance from the winding to reduce the length of wiring. Fixed contact 334 of the relay cooperates with movable contact 336, these two contacts being normally closed. Movable contact 336 is connected by wire 337 to secondary winding 338 of audio-frequency output transformer 339. Wire 332 from the microphone is connected to the remaining terminal of transformer winding 338, wire 332 being grounded as illustrated.

Output transformer 339 has primary winding 340 connected to audio-frequency amplifier generally indicated by 343. The audio-frequency amplifier may be a multi-stage amplifier designed to supply audio-frequency currents at a suitable level to output transformer 339 for feeding to transducer 326 when used as a speaker. It is understood, of course, that when thus used as a speaker, reproduction from the record is taking place.

Amplifier 343 has input channel 345 supplied by secondary winding 346 of input transformer 347. Transformer 347 has primary winding 348 with one terminal grounded and the other terminal connected by wire 349 to movable contact 350 of relay 335. Movable contact 350 cooperates with off-normal contact 350*a* connected to wire 331 and with normal contact 351.

Fixed normal contact 351 is connected to wire 352. Wire 352 is connected to terminal 353 of a compensating network for recording, terminal 353 being connected to junction 354 through resistor 355 and condenser 356 in parallel. Terminal 353 is connected through condenser 357 to grounded junction 358, which junction is connected through resistor 360 to wire 361 going to fixed contact 362 cooperating as the off-normal contact with movable contact 336 of relay 335.

Returning to wire 352, this continues through to one terminal 364 of the windings of magnetic transducer head 365. As indicated in the description of the transducer head, two connected windings are provided. Inasmuch as no separate erasing winding is provided, the transducer may have two terminals. Windings 365 have the remaining terminal 367 connected by wire 368 to junction 369. From junction 369 one wire 370 goes to bias frequency oscillator 371. The oscillator provides a high frequency bias for the recording head as is well known, the high frequency ranging anywheres from about 30,000 cycles per second up to as much as 150,000 cycles per second or more, as desired. Inasmuch as the design of such an oscillator and the details thereof are well known, no detailed showing thereof is given. The output of oscillator 371 continues to wire 372 connected to fixed contact 372*a* of relay 335. Movable grounded contact 373 of the relay cooperates with normal contact 374 connected to junction 369 on wire 368. It is understood that wires 370 and 372 are provided with high frequency from oscillator 371 and that the oscillator itself is supplied with power from a suitable source not shown. The relay may disable the oscillator for listening.

Volume controls for both Record and Listen are provided. Between junction 381 and ground is connected resistor element 382 of the Record volume control. Cooperating with resistor 382 is wiper 383. Wiper 383 is connected by wire 384 to off-normal contact 385 cooperating with movable contact 386 of the Record-Listen relay. Movable contact 386 cooperates with normal contact 387 connected to wiper 389 of potentiometer 390 for controlling volume during listening. Potentiometer 390 has one terminal grounded and has junction 391 connected back to junction 381 through compensating network consisting of resistor 392 and condenser 393 in parallel. Junction 391 is connected to wire 392a going into amplifier 343. For convenience, amplifier 343 is illustrated with an interstage amplifier 377, the audio-frequency channel being shown.

From junction 391 wire 394 goes to resistance element 395 of a variable resistor having wiper 396 connected through condenser 397 to normal contact 398 of relay 335. Normal contact 398 cooperates with movable contact 399 of the relay, said movable contact being grounded. Variable resistor 395 functions as a tone control and condenser 397 is selected to cooperate with the resistor for effecting such control.

Referring back to the handset, insulating members 328 and 329 are adapted to control a stack of contacts for effecting switching. Member 328 is adapted to operate upon contact blade 403. Contact blade 403 carries downwardly extending insulating block 404 touching blade 405 so that blade 405 moves down when blade 403 is moved downwardly upon actuation of member 328. Contact blade 405 is moved downwardly free of blade 403 when insulating member 329 is rocked to the left. Contact blade 406 is the remaining movable contact cooperating with a finger of member 329 and is operated when member 329 is rocked to the right.

Contact blade 403 is adapted to close against contact 408. Contact blade 405 is normally closed against contact 409 but is adapted to move away and close against contact 410 when moved downwardly. Movable contact blade 406 is adapted to close against contact 412 when moved downwardly.

The three movable contact blades 403, 405 and 406 are connected together and are connected by wire 414 to grounded terminal 415 of a low voltage power supply 416. As illustrated here, power supply 416 is adapted to supply 12 volts direct current. This, however, is exemplary and the power supply may be supplied at any desired potential. The direct current is preferred to avoid troubles of hum pick-up occasioned by alternating currents.

The power supply may be conventional and may consist of a step-down transformer supplied from the conventional 110-volt 60-cycle line together with rectifiers and filters. Power supply 416 has one terminal grounded at 415 as previously indicated and has its other terminal connected to supply wire 418. Wire 418 is connected to one terminal of reverse clutch solenoid 419, one terminal of forward clutch solenoid 420, one terminal of Record-Listen relay winding 335, and one terminal of bell winding 421. Across forward clutch solenoid winding 420 is connected condenser 422 to prevent contact arcing.

Reverse clutch solenoid winding 419 is connected by wire 425 to contact 412. Forward clutch solenoid winding 420 is connected by wire 426 to contact 410. The winding of Record-Listen relay 335 is connected to junction 427. Junction 427 is connected by wire 428 to contact 408 in the handset. Junction 427 is also connected to switch 430 mounted in switch body 162. Switch 430 has its other terminal connected to the bottom terminal of bell winding 421.

The operation of the machine is as follows: Assuming that the machine is energized with power and that the amplifiers are in a standby condition and the motor is turning, recording may be accomplished by pressing down on member 328 of the handset. When this occurs, contacts 403 and 408 close a circuit for Record-Listen relay 335. The various relay contacts are pulled from the positions illustrated to their off-normal positions for recording. At the same time, contacts 405 and 410 will close a circuit for forward clutch solenoid winding 420. The motor will drive the belt in a forward direction. At this point it might be observed that if switch 430 is closed because of no belt or because belt-tensioning roller is not elevated or because the carriage containing the reproducer is at the end of the record position, bell 421 will be energized simultaneously with the Record-Listen relay. Thus a warning will be given.

Assuming that everything is in order and that the belt is moving forwardly, transducer 326 functioning as a microphone will have voice currents in wires 331 and 332. Wire 332 is grounded while wire 331 is connected to off-normal contact 350a of the Record-Listen relay. Since movable contact 350 will be in the off-normal position, the voice currents will be supplied to winding 348 of input transformer 347.

The audio-frequency channel in amplifier 343 will include wire 392 going to junction 391 and thence through the network to junction 381. Potentials from wiper 383 are conducted to off-normal relay contact 385, movable contact 386, thence to the input of amplifier stage 377. The audio-frequency channel continues through the remaining stages of amplifier 343 and the output of this amplifier goes to primary 340 of output transformer 339. The secondary winding 338 has one terminal grounded and the other terminal connected by wire 337 through movable contact 336 to off-normal contact 362 and then through the network to junction 353. The circuit continues from this junction to junction 364 then through the windings of the transducer recording head and along wire 368 through the bias oscillator to wire 372 to off-normal contact 372a, through movable contact 373, thence to ground.

It is understood that the audio-frequency channel and the bias oscillator frequency channel may be connected together through transformers or condensers in a manner well known in the art. So long as insulating member 328 is maintained depressed, and assuming that the magnetic recording head does not reach the end of the belt, recording will occur.

If insulating member 329 in the handset is rocked to the left, contacts 405 and 410 will close for listening. The closure of contacts 405 and 410 will result in the energization of the winding for the forward clutch so that the belt will be driven forwardly as during recording. However, the Record-Listen relay is not energized. The bias oscillator 371 is short-circuited or disabled and the magnetic pick-up windings 365 have their top terminal grounded. Currents generated in windings 365 will travel along wire 352 to normal contact 351, movable contact 350 through winding 348 of the input transformer. The currents are then fed into the input of audio-frequency amplifier 343, the channel including wire 392a to junction 391. From junction 391 one circuit goes through the tone control to ground. From junction 391 another circuit goes through the volume control for listening, through contacts 387 and 386 to amplifier stage 377 and the channel continues to the output of the audio-frequency amplifier. The output path goes to primary 340 of the output transformer 339 and secondary 338. The circuit from secondary 338 goes through wire 337 and contacts 336 and 334 to wire 331 and results in transducer 326 functioning as a speaker.

When insulating member 329 in the handset is rocked to the right, movable contact 406 closes against contact 412. This completes the circuit for the winding of reverse clutch solenoid 419 and causes the record belt to be driven in the reverse direction. At the same time, normally closed switch contacts 405 and 409 in the handset practically short-circuit the winding of the microphone speaker transducer 326. By having low impedances (say about 50 ohms) for the transducer and output transformer and having relatively poor short-circuiting due to wiring and contacts 405 and 409, the higher reverse belt travel will result in some reproduction at relatively low volume, the reproduction being unintelligible because the belt is travelling in the reverse direction.

It should be observed that alarm bell winding 421 will be energized assuming that switch 430 is closed only when the Record-Listen relay is energized. This means that the alarm bell will be energized only during recording.

The alarm system disclosed herein may be readily used or adapted for other types of dictating machines and may readily be used with a machine having a screw type of feed, whether such feed be used with a magnetic record or with a record where a record track is cut or formed in a belt surface.

The marker mechanism herein disclosed may also be used with various types of dictating machines.

The record belt tensioning means and drive means may also be applied and used with other types of dictating machines or recording and reproducing machines generally. The transducer together with its mounting may be used with other types of magnetic belt machines. In connection with the transducer and the mounting, it is necessary that the tracking portion of the transducer contact the record belt at a region where the record belt is firmly supported. Thus as illustrated in Figure 19, the tracking part of the transducer contacts the belt at a region where the belt is just coming off from or going on to, depending upon the direction of belt travel, mandrel 25. There may be some slight curvature of the belt at the region contacted by the transducer lamination so that after a period of use, the lamination will wear in and accommodate itself to the slight curvature of the belt. Preferably, the region of tracking of the lamination of transducer 272 and the mandrel-supported portion of the record belt will satisfy the following condition. A line drawn from the center of rod 181 tangent to a portion of the mandrel-supported belt should be the location of the tracking region of contact between the lamination and belt. By virtue of this relationship, the lamination will cooperate with the belt equally well in either direction of travel of the belt. If the tracking portion of the lamination engages the belt above or below this desired region, then in one direction of belt travel or the other direction of belt travel, some binding between the belt and lamination may occur. As a rule, the transducer may be adjusted with reference to support member 202 for maximum volume of reproduction.

It is understood that switch means may be provided for stopping the electric motor while permitting the amplifier and oscillator parts of the system to be energized so that the machine may be used without waiting for any vacuum tube or tubes to warm up. It is also possible to provide additional controls such as, for example, controls operated by the hand or foot during reproduction only of the machine by a secretary.

What is claimed is:

1. In a magnetic recording-reproducing type of machine using a pregrooved record belt, the combination of a base, a pair of mandrels for said record belt, means for supporting said mandrels on said base so that the mandrel axes are parallel and lie in a generally horizontal plane, a stationary guide rod, means for supporting said rod in parallel relation to said mandrels, means for supporting a marker strip in spaced parallel relation to said mandrels, an arm slidingly supported on said guide rod and extending over both mandrels, a transducer having a belt-engaging portion carried by said arm for engaging the belt at a region where said belt is directly supported by said one mandrel, marker means carried by said arm for cooperation with said marker strip for providing an indication on said strip where there is an error or where matter begins or ends, a record belt-tensioning idler, means disposing said idler below said record belt and between said mandrels, means for mounting said belt-tensioning idler so that it may engage the record belt for tensioning the same or may be free therefrom, and means connecting said tensioning idler and said arm whereby when said idler is in belt-engaging position said transducer and marker means are in operative position and when said idler is free of said belt, said transducer and marker means are respectively free of said belt and said marker strip.

2. The combination according to claim 1 wherein said mandrels have means for limiting the movement of the belt on said mandrels and wherein said belt-tensioning idler includes means for exerting a gentle lateral force upon said belt tending to move the same on said mandrels toward the limiting position of the belt.

3. The construction according to claim 1 wherein means are provided on said marker means for moving said tensioning idler from a disengaged position to a belt-engaging position and wherein means are provided for locking said idler in a belt-disengaged position.

4. In a recording-reproducing machine of the type using a record belt, the combination of a base, a pair of record-supporting mandrels, means for supporting said mandrels on said base so that their axes are generally parallel, a tensioning idler for engaging the record belt, means including a rocking plate for supporting said tensioning idler means for supporting said rocking plate, means uring said rocking plate in a direction to move said tensioning idler against the record belt, said tensioning idler being adapted to move beyond a tensioning position in the absence of a belt, means for locking said rocker plate in a position where said tensioning idler is free of a record belt, manual means for unlocking said rocker plate to release the same so that said tensioning idler may assume a normal belt-tensioning position during use, an alarm switch, and means operated by said rocking plate in either extreme position of the tensioning idler corresponding to a locked idler position or a no-belt but unlocked idler position for operating said alarm switch.

5. The construction according to claim 4 wherein guide means are provided, means for supporting said guide means in parallel relation to said mandrels, a transducer, means coupling said transducer to said means for guiding said transducer across the belt and means coupled to said transducer for operating said alarm when said transducer has reached the end of the belt.

6. The construction according to claim 5 wherein said mandrels have means for limiting the position of the record belt thereon and wherein said belt-tensioning idler includes means for creating a gentle lateral force on the record belt tending to urge the record belt on the mandrels to the limiting position thereof.

7. In a magnetic recording-reproducing machine of the record belt type, the combination of a base, a pair of record-supporting mandrels, means for supporting said mandrels on said base in spaced relation with the axes of the mandrels parallel and lying in a generally horizontal plane, a belt-tensioning idler, a movable rocker plate, means for supporting said idler on said rocker plate so that said idler is disposed beneath said belt and generally between said mandrels, spring means for biasing said rocker plate so that said tensioning idler tends to extend up into the region between the mandrels into belt-tensioning position, spring detent means for locking said rocker plate to a position where the tensioning idler is clear of the record belt, a straight elongated guide member, means for securing said guide member so that the axis thereof is parallel to the mandrel axes, a carriage on said guide member, said carriage being translatable along said guide member to move the carriage transversely with relation to said record belt, an arm carried by said carriage and extending over both mandrels, a transducer carried by said arm and cooperating with a part of the belt which is directly supported by a mandrel, means connecting said arm with said spring detent locking means for disengaging said locking means to unlock said belt-tensioning idler by movement of said arm, an alarm switch having a normal and off-normal position, a lever for operating said alarm switch, means for moving said lever to move said switch to an off-normal position when said carriage has moved to a position corresponding to where the transducer is near the end of the record belt, and means actuated by said rocker plate for moving said lever for moving the switch to an off-normal position when said rocker plate is in either of two positions corresponding to the locked position of the belt-tensioning idler or the unlocked position of the belt-tensioning idler with no belt for restraining the idler from moving to an extreme position in response to the bias of the rocker plate.

8. In a recording-reproducing machine of the type using a pre-grooved record belt having a magnetizable coating thereon, the combination of a base, a pair of record-supporting mandrels, means for supporting said mandrels on said base in spaced parallel relation with the mandrel axes lying in a generally horizontal plane, a smooth guide rod, means for supporting said guide rod so that it is substantially parallel with the axes of the mandrels and disposed so that one mandrel is between the other mandrel and said guide rod, a carriage on said guide rod and movable along the length thereof, said guide rod having a length greater than the width of a record belt and a carriage extending along said guide rod for a distance substantially equal to the excess length of said guide rod so that said carriage may move along said guide rod for substantially the width of the belt, said carriage having bearing means at the two ends thereof only for engaging said guide rod, an arm carried by said carriage, said arm extending over said mandrels and a transducer carried by said arm for cooperation with said record belt surface and groove, said transducer lying above said belt at the region of said one mandrel, said transducer having a belt-engaging portion contacting the belt at the region where the belt begins to curve around said one mandrel, said guide rod having the axis thereof so located with reference to the axis of the one mandrel that a plane extending from the axis of said guide rod tangent to said one mandrel locates the region of contact between the belt-engaging portion of the transducer and the belt and means for driving said belt in forward or reverse direction whereby said transducer will track freely in either direction of belt travel.

9. A marker mechanism for use in a dictating machine, said mechanism comprising a marker base, a stylus support member, means for rockably mounting said stylus support member on said base, said stylus support member having two sides of different length, a finger piece on each side of said stylus support member, means for securing each finger piece to be rockable about an axis parallel with the stylus member rocking axis, each finger piece having a part for engaging a side of the stylus support member, one finger piece being on one side and the other finger piece being on the other side of said stylus support member, said finger pieces having substantially equal ranges of movement in response to manual actuation, said stylus support member being rocked through a different angle by one finger piece as compared to the other because of the different lengths of the stylus support member sides and a stylus carried by said stylus support member, said stylus being adapted to cooperate with a marker strip and being adapted to make a mark of one length or the other, depending upon which finger piece is operated, said one stylus piece functioning to make both lengths of marks.

10. In a magnetic recording-reproducing machine of the type using a record belt, said machine having a pair of parallel spaced mandrels for supporting said belt, the combination of a smooth guide rod extending parallel to the mandrel axes, a carriage slidable on said rod, said carriage including inner and outer tubular members, means at the ends of said inner tubular member for supporting the same on said smooth rod with the remainder of said tubular member clearing said rod, means for supporting the ends of said outer tubular member on the ends of said inner tubular member, a transducer supporting arm, means for supporting said transducer supporting arm on said inner tubular member, a marker assembly supporting arm, means for supporting said marker assembly supporting arm on said outer tubular member, means for maintaining said two tubular members in alined relation, and a transducer and marker assembly supported on the respective arms, said two supporting arms being free to have some play with respect to relative movement around the axis of said support rod but being laterally maintained in position.

11. In a magnetic recording-reproducing apparatus, a base, at least one mandrel having a shoulder adjacent one end of the mandrel, means for supporting said mandrel horizontally on said base, said mandrel accommodating an endless record belt having a fine helical tracking groove and magnetizable coating on the outer belt surface, a transducer for cooperation with the tracking groove and magnetizable coating, means for mounting said transducer so that it engages a belt portion directly supported by said mandrel, said transducer mounting means including a smooth stationary rod spaced from and parallel to said mandrel and including movable sleeve means disposed over said rod, said movable sleeve means and transducer forming an assembly which can move along the rod and can rock around said rod, said sleeve means contacting said rod at regions spaced along the rod at a substantial distance with intervening rod regions being clear of said sleeve means whereby said transducer assembly can move along said rod during tracking solely due to the cooperation of said transducer and fine groove without jamming and means for urging said belt against said mandrel shoulder for maintaining said belt in position.

12. In a magnetic recording-reproducing apparatus, a base, two mandrels, at least one mandrel having a shoulder adjacent one end, means for supporting said mandrels horizontally on said base, said mandrels being in spaced, parallel relation and accommodating an endless record belt having a fine helical tracking groove and magnetizable coating on the outer belt surface, a transducer for cooperation with the tracking groove and magnetizable coating, means for mounting said transducer so that it engages a belt portion directly supported by one mandrel, said transducer mounting means including a smooth stationary rod spaced from and parallel to said mandrels and including movable sleeve means disposed over said rod, said movable sleeve means and transducer forming an assembly which can move along the rod and can rock around said rod, said sleeve means contacting said rod at regions spaced along the rod at a substantial distance with intervening rod regions being clear of said sleeve means whereby said transducer assembly can move along said rod during tracking without jamming, said assembly being moved along said rod during operation solely by the cooperation between said transducer and fine tracking groove and means for urging said belt against said mandrel shoulder for maintaining said belt in position.

13. In a magnetic recording-reproducing apparatus, a base, two mandrels, each mandrel having a shoulder adjacent one end, means for supporting said mandrels horizontally on said base, said mandrels being in spaced, parallel relation and accommodating an endless record belt having a fine helical tracking groove and magnetizable coating on the outer belt surface, a transducer for cooperation with the tracking groove and magnetizable coating, means for mounting said transducer so that it engages a belt portion directly supported by one mandrel, said transducer mounting means including a smooth stationary rod spaced from and parallel to said mandrels and including movable sleeve means disposed over said rod, said movable sleeve means and transducer forming an assembly which can move along the rod, said sleeve means contacting said rod at regions spaced along the rod at a substantial distance with intervening rod regions being clear of said sleeve means whereby said transducer assembly can move along said rod during tracking without jamming, said assembly being moved along said rod during operation solely by the cooperation between said transducer and fine tracking groove and means for urging said belt against said mandrel shoulders for maintaining said belt in position, said means comprising an idler for tensioning the belt, said idler engaging said belt nonsymmetrically.

14. The construction according to claim 13 wherein said idler is disposed below the mandrels and spring means for maintaining said idler in belt engaging or belt disengaging positions.

15. In a magnetic recording-reproducing machine of the type using an endless record belt, the combination of a base, two spaced parallel mandrels in horizontal position on said base, said mandrels accommodating said record belt, a clutch for each mandrel, said two clutches being adjacent each other and having driven parts rigidly secured to said mandrels and having driver parts, said clutches being uni-directional in operation with one clutch being adapted to drive one mandrel in one direction and the other clutch being adapted to drive the other mandrel in reverse direction, a pulley for each clutch driver part, the pulley for the reverse clutch being smaller than the other pulley, a flywheel having substantial inertia, electric motor means for driving said flywheel in one direction at all times, a belt drive for connecting said flywheel and said two pulleys, said belt having its inner surface driving the smaller pulley and having its outer surface driving said larger pulley, a transducer for cooperation with the outer surface of a record belt, means for mounting said transducer to engage a portion of the belt above a mandrel where the belt begins to curve around the mandrel surface and means for selectively controlling said clutches to drive the record belt forward at one speed and to reverse the record belt at a higher speed while the transducer engages the record belt surface.

16. The construction according to claim 15 wherein a hand control is provided, said hand control having two movable members, one member having simple On-Off positions, the other member having an Off position, Reverse, and Listen positions, means for interlocking said members so that said first member cannot be in on the On position at the same time that the second member is in Reverse position, circuit means controlled by said one member so that the forward clutch is energized and recording circuits are energized when said one member is On and circuit means controlled by the other member when said other member is in the Reverse position for energizing the reverse clutch and circuit means controlled by said other member in the Listen position for energizing the forward clutch and the listening circuits for said machine.

17. In a magnetic recording-reproducing machine of the type using an endless record belt, the combination of a base, two spaced parallel mandrels in horizontal position on said base, each mandrel having a shoulder at one end thereof, said mandrels accommodating said record belt, a clutch for each mandrel, said two clutches being adjacent each other and having driven parts rigidly secured to said mandrels and having driver parts, said clutches being uni-directional in operation with one clutch being adapted to drive one mandrel in one direction and the other clutch being adapted to drive the other mandrel in reverse direction, a pulley for each clutch driver part, the pulley for the reverse clutch being smaller than the other pulley, a flywheel having substantial inertia, electric motor means for driving said flywheel in one direction at all times, a belt drive for connecting said flywheel and said two pulleys, said belt having its inner surface driving the smaller pulley and having its outer surface driving said larger pulley, a transducer for cooperation with the outer surface of a record belt, means for mounting said transducer to engage a portion of the belt above a mandrel where the belt begins to curve around the mandrel surface, means for selectively controlling said clutches to drive the record belt forward at one speed and to reverse the record belt at a higher speed while the transducer engages the record belt surface and means for urging said record belt against said mandrel shoulders in either direction of belt travel.

18. In a magnetic recording-reproducing machine of the type using an endless record belt provided with a fine tracking groove, the combination of a base, two spaced parallel mandrels in horizontal position on said base, each mandrel having a shoulder at one end thereof, said mandrels accommodating said record belt, a clutch for each mandrel, said two clutches being adjacent each other and having driven parts rigidly secured to said mandrels and having driver parts, said clutches being uni-directional in operation with one clutch being adapted to drive one mandrel in one direction and the other clutch being adapted to drive the other mandrel in reverse direction, a pulley for each clutch driver part, the pulley for the reverse clutch being smaller than the other pulley, a flywheel having substantial inertia, electric motor means for driving said flywheel in one direction at all times, a belt drive for connecting said flywheel and said two pulleys, said belt having its inner surface driving the smaller pulley and having its outer surface driving said larger pulley, a transducer for cooperation with the outer surface of a record belt, means for mounting said transducer to engage a portion of the belt above a mandrel where the belt begins to curve around the mandrel surface, said transducer mounting means including a smooth stationary rod parallel to said mandrels and a carriage engaging said rod at two regions spaced along said rod, said carriage and transducer being movable together freely along said rod under the influence of said tracking groove, means for selectively controlling said clutches to drive the record belt forward at one speed and to reverse the record belt at a higher speed while the transducer engages the record belt surface and means for urging said record belt against said mandrel shoulders in either direction of belt travel.

19. In a magnetic recorder-reproducer machine of the type using an endless wide record belt having a magnetizable coating thereon, the combination of a base carrying at least one record belt supporting mandrel, a permanent magnet erasing assembly extending along the full width of the record belt, said assembly including a long bar of rectangular cross section extending along the full width of the record belt, said bar being the permanent magnet and having pole faces along two opposite long sides of the bar, one side comprising one pole face and the other side comprising the other pole face, a generally U-shaped ferromagnetic pole piece, said pole piece extending the full length of the bar with the bottom of the U being against one pole face and the sides of the U being spaced from but extending along parallel to the non-polar sides of the bar and the free ends of the U terminating near the other pole face to provide erasing fields, means for maintaining said bar and pole piece in predetermined relation, means for pivotally securing said assembly along a pivot axis parallel to said mandrel axis, said assembly being mounted so that the side having the free ends of the U-shaped pole piece can be swung toward or away from the belt surface, means for limiting the movement of said assembly on its pivot axis, said assembly in a non-erase position having the erasing fields remote from the belt surface, said assembly in erase position having the erasing fields to act on the belt surface, said assembly providing erasing fields of opposite polarity as the belt travels past the assembly in erase position with different clearances between the belt surface and leading and trailing pole parts of the assembly.

20. A marker mechanism for use in a dictating machine, said mechanism comprising a base, a rocker pivotally supported on said base to move about one axis, a stylus support arm pivotally supported on said rocker to move about a second axis parallel to and laterally offset from the one axis, said support arm carrying a marking stylus, said rocker having two side portions, a pair of finger pieces pivotally supported on said base, one finger piece cooperating with one rocker side portion and the other finger piece cooperating with the other rocker side portion, said finger pieces being rockable from normal rest positions to engage the respective rocker side portions and upon further movement of said finger pieces to cause said rocker to move and thus move the stylus arm away from a normal position, means for limiting the movement of said finger pieces, means for biasing said finger pieces and stylus arm to normal positions, and means to provide different clearances between one cooperating finger piece and one rocker side portion on the one hand and the other finger piece and other rocker side portion on the other hand whereby the one stylus arm is moved from normal position over two different ranges in the same direction to provide two different marker lengths.

21. In a dictating machine of the type having at least one mandrel and a record belt thereon with means for tensioning said record belt and having transducer means movable across said belt during the course of recording or reproduction, the combination of an alarm, a finger for operating said alarm, lever means for operating said finger to sound an alarm, means for mounting said lever means to a normal position from which said lever means is movable in one direction or another direction from said normal position, said lever means including means for operating said finger upon movement of said lever means away from its normal position, means controlled by said transducer means for operating said lever means and moving the same to one position when said transducer means has reached the end of its predetermined range of travel transversely of the belt, and means controlled by said belt tensioning means for moving said lever means to its other position in the absence of belt tension.

References Cited in the file of this patent

UNITED STATES PATENTS

| | | |
|---|---|---|
| 151,256 | Walker | May 26, 1874 |
| 2,361,752 | Eilenberger | Oct. 31, 1944 |
| 2,433,207 | Eilenberger | Dec. 23, 1947 |
| 2,546,927 | Howell | Mar. 27, 1951 |
| 2,589,035 | Begun | Mar. 11, 1952 |
| 2,594,934 | Kornei | Apr. 29, 1952 |
| 2,702,710 | Conrad | Feb. 22, 1955 |
| 2,751,274 | Andrews | June 19, 1956 |
| 2,782,041 | Muller | Feb. 19, 1957 |
| 2,820,639 | Gillette et al. | Jan. 21, 1958 |
| 2,843,386 | Stanton et al. | July 12, 1958 |
| 2,847,223 | Taylor et al. | Aug. 12, 1958 |

FOREIGN PATENTS

| | | |
|---|---|---|
| 322,252 | Germany | June 24, 1920 |
| 1,012,346 | France | July 8, 1952 |